(12) United States Patent
Ren

(10) Patent No.: US 12,156,171 B2
(45) Date of Patent: Nov. 26, 2024

(54) SIGNAL TRANSMISSION METHOD AND APPARATUS

(71) Applicant: DATANG MOBILE COMMUNICATIONS EQUIPMENT CO., LTD., Beijing (CN)

(72) Inventor: Bin Ren, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 269 days.

(21) Appl. No.: 17/624,818

(22) PCT Filed: Jul. 3, 2020

(86) PCT No.: PCT/CN2020/100220
§ 371 (c)(1),
(2) Date: Jan. 4, 2022

(87) PCT Pub. No.: WO2021/000951
PCT Pub. Date: Jan. 7, 2021

(65) Prior Publication Data
US 2022/0330198 A1  Oct. 13, 2022

(30) Foreign Application Priority Data
Jul. 4, 2019  (CN) .......................... 201910599235.X

(51) Int. Cl.
*H04W 64/00* (2009.01)
*H04B 17/309* (2015.01)

(52) U.S. Cl.
CPC ........ *H04W 64/006* (2013.01); *H04B 17/309* (2015.01)

(58) Field of Classification Search
CPC ... H04W 64/00; H04W 64/006; H04W 24/08; H04W 24/10; H04B 17/309; H04L 5/0048; H04L 5/0053; H04L 5/0057
See application file for complete search history.

(56) References Cited

U.S. PATENT DOCUMENTS

2014/0349677 A1   11/2014   Xiao et al.
2016/0174093 A1   6/2016    Zhou et al.
(Continued)

FOREIGN PATENT DOCUMENTS

CN   102835084 A   12/2012
CN   103037504 A   4/2013
(Continued)

OTHER PUBLICATIONS

Huawei et al.,"DL RS design for NR positioning", 3GPP TSG RAN WG1 #97, Reno, USA, May 13-17, 2019, total 7 pages, R1-1906052.
(Continued)

*Primary Examiner* — Siu M Lee
(74) *Attorney, Agent, or Firm* — Kilpatrick Townsend & Stockton LLP

(57) ABSTRACT

Disclosed are a signal transmission method and apparatus, and same are used for realizing reference signal (RS) transmission of adaptive UE-specific RS resource configuration on the basis of a quality indication of a positioning measurement value. The signal transmission method provided in the present application includes receiving a UE-specific reference signal (RS) by means of a terminal-level UE-specific reference signal resource, and the UE-specific reference signal resource is determined by a network side on the basis of a quality indication, determined by a terminal, of a positioning measurement value and determining and reporting positioning information on the basis of measurement of the UE-specific RS.

20 Claims, 7 Drawing Sheets

```
Determining a UE-specific reference signal resource; where the     S601
UE-specific reference signal resource is determined by a network
side based on a quality indication of a positioning measurement value
reported by a terminal

↓

Sending a UE-specific RS to the terminal through the UE-specific    S602
reference signal resource
```

(56) References Cited

U.S. PATENT DOCUMENTS

| | | | |
|---|---|---|---|
| 2017/0006575 A1* | 1/2017 | Cui | G01S 5/0036 |
| 2017/0111880 A1* | 4/2017 | Park | H04W 64/00 |
| 2017/0289831 A1 | 10/2017 | Park et al. | |
| 2018/0343635 A1 | 11/2018 | Edge et al. | |
| 2021/0351887 A1* | 11/2021 | Qi | H04L 5/005 |
| 2022/0123879 A1* | 4/2022 | Munier | H04W 56/001 |
| 2022/0131727 A1* | 4/2022 | Khoryaev | H04L 27/261 |
| 2022/0159415 A1* | 5/2022 | Khoryaev | H04L 27/261 |
| 2022/0416975 A1* | 12/2022 | Ren | H04L 27/26025 |

FOREIGN PATENT DOCUMENTS

| | | | |
|---|---|---|---|
| CN | 103209475 A | | 7/2013 |
| CN | 103428749 A | | 12/2013 |
| CN | 103517314 A | | 1/2014 |
| CN | 105493585 A | | 4/2016 |
| CN | 108282285 A | | 7/2018 |
| CN | 109923842 A | | 6/2019 |
| EP | 2797347 A1 | | 10/2014 |
| EP | 3264838 A1 | | 1/2018 |
| EP | 3457612 A1 | | 3/2019 |
| EP | 3648496 A1 | | 5/2020 |
| EP | 3965438 A1 | | 3/2022 |
| WO | 2017026672 A1 | | 2/2017 |
| WO | 2019027539 A1 | | 2/2019 |
| WO | 2019074435 A1 | | 4/2019 |

OTHER PUBLICATIONS

CMCC, "Discussion on physical-layer procedures to support NR positioning measurements", 3GPP TSG RAN WG1 #97, Reno, USA, May 13-17, 2019, total 3 pages, R1-1906526.

Qualcomm Incorporated, "DL and UL NR Positioning Procedures", 3GPP TSG-RAN WG2 Meeting #106, Reno, Nevada, USA, May 13-17, 2019, total 8 pages, R2-1906779(Revision of R2-1903135).

3GPP TS 38.455 V 15.2.1, 3rd Generation Partnership Project; Technical Specification Group Radio Access Network; NG-RAN; NR Positioning Protocol A (NRPPa), (Release 15), total 60 pages, Jan. 2019.

3GPP TS 38.305 V 15.4.0, 3rd Generation Partnership Project; Technical Specification Group Radio Access Network; NG Radio Access Network (NG-RAN); Stage 2 functional specification of User Equipment (UE) positioning in NG-RAN (Release 15), total 72 pages, Jun. 2019.

* cited by examiner

-- Prior Art --

SIGNAL TRANSMISSION METHOD AND APPARATUS

CROSS-REFERENCE OF RELATED APPLICATIONS

The present application is a National Stage of International Application No. PCT/CN2020/100220, filed on Jul. 3, 2020, which claims the priority from Chinese Patent Application No. 201910599235.X, filed with the Chinese Patent Office on Jul. 4, 2019 and entitled "Signal Transmission Method and Apparatus", which is hereby incorporated by reference in its entirety.

FIELD OF DISCLOSURE

The present application relates to the field of communication technologies, and particularly to a signal transmission method and apparatus.

BACKGROUND

The performance requirements for commercial application of 5G positioning is determined in the prior art, including seven positioning performance levels: six absolute positioning performance requirements with horizontal accuracy from 0.3 m to 10 m and vertical accuracy from 2 m to 3 m; and one relative positioning performance requirement with horizontal accuracy of 0.2 m and vertical accuracy of 0.2 m. The seven kinds of positioning performance use the confidence of 95%, 99% and 99.9%.

The Third Generation Partnership Project (3GPP) will introduce a variety of technologies for 5G New Radio (NR) positioning, including uplink Observed Time Difference of Arrival (OTDOA), Enhanced cell ID (E-CID, that is, Timing Advance (TA)+Angle of Arrival (AoA)) and Multiple-cell RTT (Multi-RTT), etc.

The OTDOA is a positioning method defined in 3GPP protocol specifications. The basic principle of the OTDOA is: a User Equipment (UE) measures downlink Positioning Reference Signals (PRSs) sent from multiple Transmission Points (TPs), which may also include Downlink Reference Signals (DL-RSs), to obtain the measurement values of the Reference Signal Time Difference (RSTD) arriving at the UE, and reports them to a positioning server in the network to estimate the position of the UE. The positioning server is called Location Management Function (LMF) in the New Generation Radio Access Network (NG-RAN). In the OTDOA positioning process, the LMF needs to obtain the OTDOA auxiliary information associated with a cell (for example, physical cell ID, cell antenna position and RS configuration, etc.) from a Base Station (BS) through a positioning protocol (for example, NR Positioning Protocol A (NRPPa)) specified in 3GPP. Then, the UE obtains the OTDOA auxiliary information for supporting the RSTD measurement from the LMF through a positioning protocol (for example, NR Positioning Protocol (NRPP)) specified in 3GPP.

The principle of the E-CID (namely TA+AoA) is to calculate the position through the angle between the line from the terminal to the target base station and the true north direction (namely AoA) as well as the Timing Advance (TA) of the terminal. The E-CID positioning measurement values include AoA, TA, eNB receiving-transmitting time difference measurement, UE receiving-transmitting time difference measurement (Rx-Tx time difference), where the specification stipulates the reporting mapping of the AoA, TA and UE receiving-transmitting time difference measurement, and the accuracy requirement of the UE receiving-transmitting time difference measurement.

The principle of the Multi-RTT is: a terminal measures the downlink reference signals from the serving base station and one or more neighboring base stations to obtain the measurement values of the UE receiving-transmitting time differences (Rx-Tx time differences) of different base stations, and reports the measurement values to the serving base station; all the base stations then obtain the distances between the terminal and the base stations or the Timing Advance (TA) according to the uplink timing measurement value and then calculate the terminal position in combination with the antenna positions of all the base stations. One advantage of the Multiple-RTT is that the synchronization requirement among the base stations of the network is reduced.

FIG. 1 shows a basic OTDOA positioning process containing "UE-triggered positioning information transmission process" and "LMF-triggered positioning information transmission process", which includes eleven steps as follows.

Step 101: a UE is in the Radio Resource Control connection (RRC CONNECTED) state after the UE establishes a connection with a BS.

Step 102: a positioning server sends a "request positioning capability" message to the UE to request the UE to notify the server of the positioning function that the UE can support.

Step 103: the UE sends a "provide positioning capability" message in response to the positioning server. The "provide positioning capability" message reports the positioning capability of the UE (i.e., the terminal) to support the NG-RAN OTDOA.

Step 104: the UE sends a "request positioning assistance data" message to the positioning server when the downlink positioning assistance data is needed. This message includes requesting the positioning server to provide the OTDOA assistance data.

Step 105: the positioning server sends an "OTDOA information request (NRPPa OTDOA INFORMATION REQUEST)" message to the BS, where this message requests the BS to provide the downlink positioning assistance data, such as the RS configuration data.

Step 106: the BS sends an "OTDOA information response (NRPPa OTDOA INFORMATION RESPONSE)" message to the positioning server, to provide the positioning server with the requested downlink positioning assistance data, including the RS configuration data.

Step 107: the positioning server provides the positioning assistance data requested by the UE in the "provide positioning assistance data" message, which carries the RS configuration data.

Step 108: the positioning server sends a "request positioning information" message to the UE. This message requests the UE to measure the downlink RS of the BS and reply the measured positioning measurement value.

Step 109: the UE measures the downlink signal by using the positioning assistance data (for example: RS configuration data) to obtain a positioning measurement value (for example: RSTD).

Step 110: the UE sends a "provide positioning information" message to the positioning server, which includes the positioning measurement value (for example: RSTD) obtained by measuring the downlink RS.

Step 111: the positioning server calculates the position of the UE by using the positioning measurement value obtained by the UE.

In terms of time, the step 105 and step 106 have no anteroposterior relationship with the step 101 to step 104. That is, the step 105 and step 106 may occur before, after, or at the same time as the step 101 to step 104.

The "LMF-triggered positioning information transmission process" includes all the eleven steps; and the "UE-triggered positioning information transmission process" includes ten steps except step 108.

The current LTE protocol only includes the quality indication of the positioning measurement value, and does not include the decision result of the quality indication of the positioning measurement value. Since the LTE only supports the OTDOA and E-CID positioning technologies and does not support the Multi-RTT positioning technology, the LTE has neither the quality indication information of the positioning measurement value nor the decision result of the quality indication of the positioning measurement value based on the Multi-RTT.

To sum up, in the current 5G NR system, the downlink RS-based positioning measurement values reported by the UE to the network contain no quality indication information of the measurement values, so the network cannot adjust the UE-specific downlink RS resources adaptively based on the downlink RS-based positioning measurement values reported by the UE alone. Two problems may occur: (1) when the UE has the better measurement accuracy based on cell-specific downlink RSs, the network configures UE-specific RS resources with higher measurement accuracy, resulting in a waste of RS resources; (2) when the UE has the poor measurement accuracy based on cell-specific downlink RSs, the network configures UE-specific downlink RS resources with lower measurement accuracy, so that the UE-specific RS resources cannot meet the measurement accuracy.

BRIEF SUMMARY

The embodiments of the present application provide a signal transmission method and apparatus, to implement the reference signal transmission of the adaptive UE-specific RS resource configuration based on the quality indication of the positioning measurement value.

On the terminal side, a signal transmission method provided by an embodiment of the present application includes:
receiving a UE-specific Reference Signal (RS) through a UE-specific reference signal resource; where the UE-specific reference signal resource is determined by a network side based on a quality indication of a positioning measurement value determined by a terminal;
determining and reporting positioning information based on measuring the UE-specific RS.

Through this method, the UE-specific RS is received through the UE-specific reference signal resource; where the UE-specific reference signal resource is determined by the network side based on the quality indication of the positioning measurement value determined by the terminal; and the positioning information is determined and reported based on measuring the UE-specific RS, implementing the reference signal transmission of the adaptive UE-specific RS resource configuration based on the quality indication of the positioning measurement value.

In one embodiment, the quality indication of the positioning measurement value is determined by followings:

obtaining configuration information of cell-specific reference signal resources;
receiving a cell-specific RS according to the configuration information of cell-specific reference signal resources;
determining a first positioning measurement value by measuring the cell-specific RS, and determining a quality indication of the first positioning measurement value and/or a decision result of the quality indication of the first positioning measurement value.

In one embodiment, the determining the decision result of the quality indication of the first positioning measurement value, includes:
determining a decision result of whether the quality indication of the first positioning measurement value satisfies a performance requirement by comparing the quality indication of the first positioning measurement value with a preset threshold value.

In one embodiment, the UE-specific reference signal resource is determined by the network side based on a first positioning measurement value and a quality indication of the first positioning measurement value or the first positioning measurement value and a decision result of the quality indication of the first positioning measurement value reported by the terminal.

In one embodiment, the determining and reporting the positioning information based on measuring the UE-specific RS, includes:
determining a second positioning measurement value by measuring the UE-specific RS;
determining a quality indication of the second positioning measurement value and/or a decision result of the quality indication of the second positioning measurement value according to the second positioning measurement value;
determining and reporting a third positioning measurement value based on a first positioning measurement value obtained by measuring a cell-specific RS and the second positioning measurement value.

In one embodiment, the method further includes: determining a quality indication of the second positioning measurement value and/or a decision result of the quality indication of the second positioning measurement value according to the second positioning measurement value;

The determining the third positioning measurement value based on the first positioning measurement value and the second positioning measurement value, includes:
processing the first positioning measurement value and the second positioning measurement value according to the quality indication of the first positioning measurement value and/or the decision result of the quality indication of the first positioning measurement value as well as the quality indication of the second positioning measurement value and/or the decision result of the quality indication of the second positioning measurement value, to determine the third positioning measurement value.

In one embodiment, any one of the RSs includes one or a combination of: New Radio Positioning Reference Signal (NR PRS), Channel State Information-Reference Signal (CSI-RS), Synchronization Signal/PBCH Block (SSB).

In one embodiment, configuration information of any one of the reference signal resources is obtained through one or a combination of:
broadcast signaling;
Radio Resource Control (RRC) signaling;
Downlink Control Information (DCI) signaling;
New Radio Positioning Protocol (NRPP) signaling.

In one embodiment, any one of the positioning measurement values includes at least one of: Reference Signal Time Difference (RSTD), or terminal receiving-transmitting time difference.

In one embodiment, any one of the quality indications of the positioning measurement values includes at least one of: Reference Signal Received Power (RSRP), Reference Signal Received Quality (RSRQ), Signal to Interference plus Noise Ratio (SINR), an error of a measurement value, or a decision result of a quality indication of a positioning measurement value.

On the base station side, a signal transmission method provided by an embodiment of the present application includes:
 determining a UE-specific reference signal resource; where the UE-specific reference signal resource is determined by a network side based on a quality indication of a positioning measurement value reported by a terminal;
 sending a UE-specific RS to the terminal through the UE-specific reference signal resource.

In one embodiment, the method further includes:
 determining a cell-specific reference signal resource;
 sending a cell-specific RS to the terminal through the cell-specific reference signal resource.

In one embodiment, the UE-specific reference signal resource and/or the cell-specific reference signal resource is/are determined by receiving configuration information sent by a Location Management Function, LMF.

In one embodiment, the method further includes:
 notifying the terminal of configuration information of the UE-specific reference signal resource and/or the cell-specific reference signal resource through broadcast signaling, RRC signaling or DCI signaling.

Correspondingly, on the LMF side, a signal transmission method provided by an embodiment of the present application includes:
 determining a UE-specific reference signal resource based on a quality indication of a positioning measurement value reported by a terminal;
 sending configuration information of the UE-specific reference signal resource.

In one embodiment, determining the UE-specific reference signal resource based on the quality indication of the positioning measurement value reported by the terminal, includes:
 in response to a quality indication of a first positioning measurement value reported by the terminal being received, determining a decision result of whether the quality indication of the first positioning measurement value satisfies a performance requirement by comparing the quality indication of the first positioning measurement value with a preset threshold value, and determining the UE-specific reference signal resource according to the decision result;
 in response to a decision result of a quality indication of a first positioning measurement value reported by the terminal being received, determining the UE-specific reference signal resource directly according to the decision result, where the decision result represents whether the quality indication of the first positioning measurement value satisfies a performance requirement.

In one embodiment, the UE-specific reference signal resource determined for the terminal is a first UE-specific reference signal resource in response to the decision result indicating that the quality indication of the first positioning measurement value does not satisfy the performance requirement, and the UE-specific reference signal resource determined for the terminal is a second UE-specific reference signal resource in response to the decision result indicating that the quality indication of the first positioning measurement value satisfies the performance requirement;
 a frequency-domain bandwidth occupied by the first UE-specific reference signal resource is greater than a frequency-domain bandwidth occupied by the second UE-specific reference signal resource, and/or a quantity of time-domain OFDM symbols occupied by the first UE-specific reference signal resource is greater than a quantity of time-domain OFDM symbols occupied by the second UE-specific reference signal resource.

In one embodiment, the method further includes: receiving a third positioning measurement value reported by the terminal, and determining a position of the terminal.

On the terminal side, a signal transmission apparatus provided by an embodiment of the present application includes:
 a memory configured to store program instructions;
 a processor configured to invoke the program instructions stored in the memory, and execute according to an obtained program:
 receiving a UE-specific RS through a UE-specific reference signal resource; where the UE-specific reference signal resource is determined by a network side based on a quality indication of a positioning measurement value determined by a terminal;
 determining and reporting positioning information based on measuring the UE-specific RS.

In one embodiment, the quality indication of the positioning measurement value is determined by followings:
 obtaining configuration information of cell-specific reference signal resources;
 receiving a cell-specific RS according to the configuration information of cell-specific reference signal resources;
 determining a first positioning measurement value by measuring the cell-specific RS, and determining a quality indication of the first positioning measurement value and/or a decision result of the quality indication of the first positioning measurement value.

In one embodiment, the determining the decision result of the quality indication of the first positioning measurement value, specifically includes:
 determining a decision result of whether the quality indication of the first positioning measurement value satisfies a performance requirement by comparing the quality indication of the first positioning measurement value with a preset threshold value.

In one embodiment, the UE-specific reference signal resource is determined by the network side based on a first positioning measurement value and a quality indication of the first positioning measurement value or the first positioning measurement value and a decision result of the quality indication of the first positioning measurement value reported by the terminal.

In one embodiment, the determining and reporting the positioning information based on measuring the UE-specific RS, includes:
 determining a second positioning measurement value by measuring the UE-specific RS;
 determining a quality indication of the second positioning measurement value and/or a decision result of the quality indication of the second positioning measurement value according to the second positioning measurement value;

determining and reporting a third positioning measurement value based on a first positioning measurement value obtained by measuring a cell-specific RS and the second positioning measurement value.

In one embodiment, the processor is further configured to: determine a quality indication of the second positioning measurement value and/or a decision result of the quality indication of the second positioning measurement value according to the second positioning measurement value;

determining the third positioning measurement value based on the first positioning measurement value and the second positioning measurement value, specifically includes:

processing the first positioning measurement value and the second positioning measurement value according to the quality indication of the first positioning measurement value and/or the decision result of the quality indication of the first positioning measurement value as well as the quality indication of the second positioning measurement value and/or the decision result of the quality indication of the second positioning measurement value, to determine the third positioning measurement value.

In one embodiment, any one of the RSs includes one or a combination of: NR PRS, CSI-RS, SSB.

In one embodiment, the processor obtains configuration information of any one of the reference signal resources through one or a combination of:
broadcast signaling;
RRC signaling;
DCI signaling;
NRPP signaling.

In one embodiment, any one of the positioning measurement values includes at least one of: RSTD, or terminal receiving-transmitting time difference.

In one embodiment, any one of the quality indications of the positioning measurement values includes at least one of: RSRP, RSRQ, SINR, an error of a measurement value, or a decision result of a quality indication of a positioning measurement value.

On the base station side, a signal transmission apparatus provided by an embodiment of the present application includes:
a memory configured to store program instructions;
a processor configured to invoke the program instructions stored in the memory, and execute according to an obtained program:
determining a UE-specific reference signal resource; where the UE-specific reference signal resource is determined by a network side based on a quality indication of a positioning measurement value reported by a terminal;
sending a UE-specific RS to the terminal through the UE-specific reference signal resource.

In one embodiment, the processor is further configured to:
determine a cell-specific reference signal resource;
send a cell-specific RS to the terminal through the cell-specific reference signal resource.

In one embodiment, the UE-specific reference signal resource and/or the cell-specific reference signal resource is/are determined by receiving configuration information sent by an LMF.

In one embodiment, the processor is further configured to:
notify the terminal of configuration information of the UE-specific reference signal resource and/or the cell-specific reference signal resource through broadcast signaling, RRC signaling or DCI signaling.

On the LMF side, a signal transmission apparatus provided by an embodiment of the present application includes:
a memory configured to store program instructions;
a processor configured to invoke the program instructions stored in the memory, and execute according to an obtained program:
determining a UE-specific reference signal resource based on a quality indication of a positioning measurement value reported by a terminal;
sending configuration information of the UE-specific reference signal resource.

In one embodiment, determining the UE-specific reference signal resource based on the quality indication of the positioning measurement value reported by the terminal, specifically includes:
in response to a quality indication of a first positioning measurement value reported by the terminal being received, determining a decision result of whether the quality indication of the first positioning measurement value satisfies a performance requirement by comparing the quality indication of the first positioning measurement value with a preset threshold value, and determining the UE-specific reference signal resource according to the decision result;
in response to a decision result of a quality indication of a first positioning measurement value reported by the terminal being received, determining the UE-specific reference signal resource directly according to the decision result, where the decision result represents whether the quality indication of the first positioning measurement value satisfies a performance requirement.

In one embodiment, the UE-specific reference signal resource determined for the terminal is a first UE-specific reference signal resource when the decision result indicates that the quality indication of the first positioning measurement value does not satisfy the performance requirement, and the UE-specific reference signal resource determined for the terminal is a second UE-specific reference signal resource in response to the decision result indicates that the quality indication of the first positioning measurement value satisfies the performance requirement;
a frequency-domain bandwidth occupied by the first UE-specific reference signal resource is greater than a frequency-domain bandwidth occupied by the second UE-specific reference signal resource, and/or a quantity of time-domain OFDM symbols occupied by the first UE-specific reference signal resource is greater than a quantity of time-domain OFDM symbols occupied by the second UE-specific reference signal resource.

In one embodiment, the processor is further configured to: receive a third positioning measurement value reported by the terminal, and determine a position of the terminal.

On the terminal side, another signal transmission apparatus provided by an embodiment of the present application includes:
a receiving device configured to receive a UE-specific RS through a UE-specific reference signal resource; where the UE-specific reference signal resource is determined by a network side based on a quality indication of a positioning measurement value determined by a terminal;
a determining device configured to determine and report positioning information based on measuring the UE-specific RS.

On the base station side, another signal transmission apparatus provided by an embodiment of the present application includes:
a first determining device configured to determine a UE-specific reference signal resource; where the UE-specific reference signal resource is determined by a network side based on a quality indication of a positioning measurement value reported by a terminal;

a first sending device configured to send a UE-specific RS to the terminal through the UE-specific reference signal resource.

On the LMF side, another signal transmission apparatus provided by an embodiment of the present application includes:

a second determining device configured to determine a UE-specific reference signal resource based on a quality indication of a positioning measurement value reported by a terminal;

a second sending device configured to send configuration information of the UE-specific reference signal resource.

Another embodiment of the present application provides a computing device, which includes a memory and a processor, where the memory is configured to store the program instructions, and the processor is configured to invoke the program instructions stored in the memory and perform any one of the above-mentioned signal transmission methods in accordance with the obtained program.

Another embodiment of the present application provides a computer storage medium storing the computer executable instructions which are configured to cause the computer to perform any one of the above-mentioned signal transmission methods.

BRIEF DESCRIPTION OF THE DRAWINGS

In order to illustrate the embodiments of the present application more clearly, the accompanying figures which need to be used in describing the embodiments will be introduced below briefly.

DETAILED DESCRIPTION OF THE EMBODIMENTS

Figure 1:
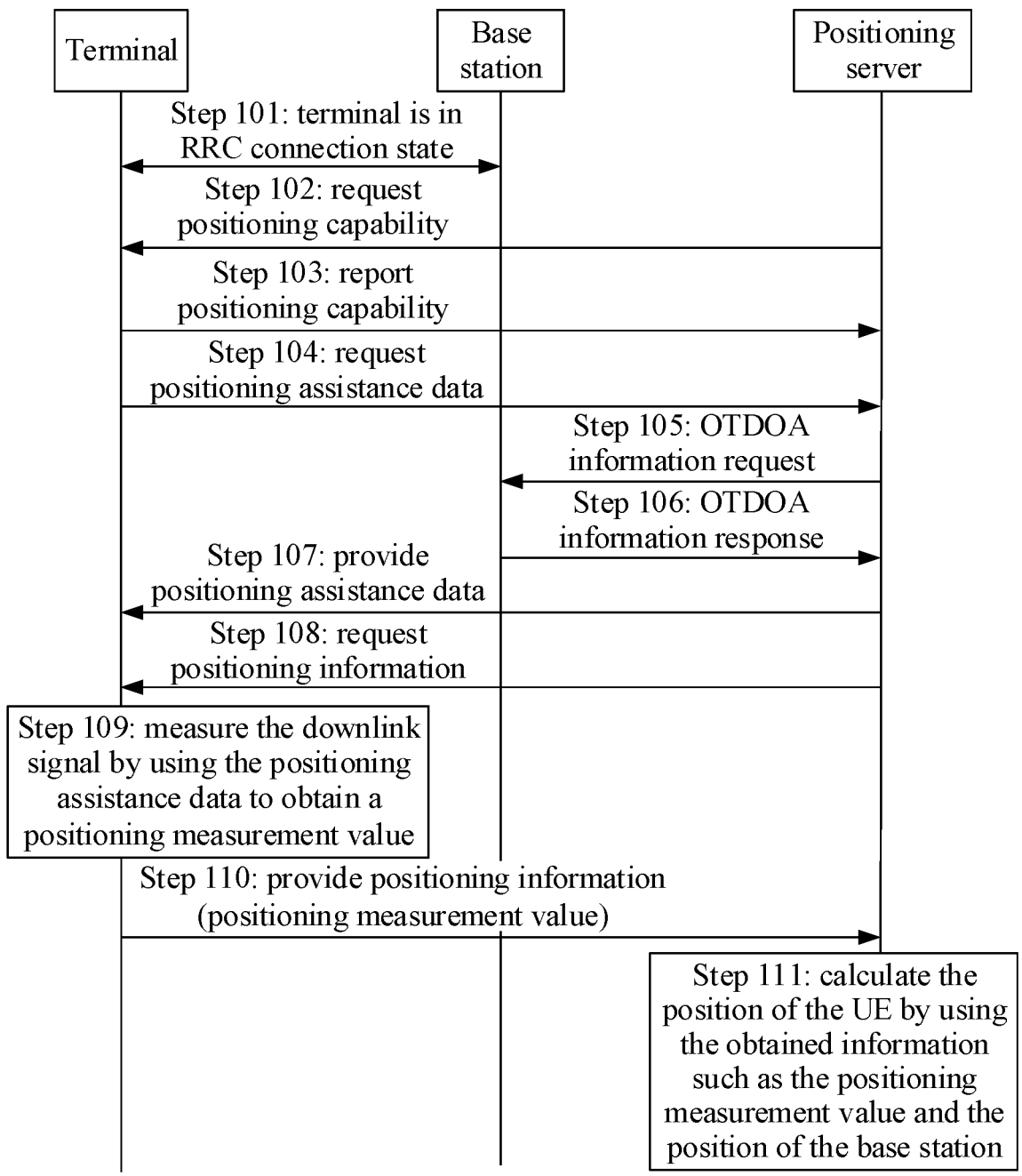
FIG. 1 is a schematic diagram of a basic positioning process of the OTDOA in the prior art.

The embodiments of the present application will be described clearly and completely below in combination with the accompanying drawings in the embodiments of the present application. Obviously the described embodiments are only a part of the embodiments of the present application but not all the embodiments.

Currently, the report of the downlink RS positioning measurement value defined by the 5G NR does not include the quality indication information of the measurement value, so it is difficult for the network to determine the UE-specific RS resources suitable for a UE based on the RS positioning measurement value reported by the UE.

Embodiments of the present application provide the signal transmission methods and apparatuses on the terminal side and the network side, to implement the adaptive UE-specific RS resource configuration based on the quality indication of the positioning measurement value, and transmit and locate reference signals based on the resource configuration, improving the performance of the entire system.

Here, the method and apparatus are based on the same application concept. Since the principle of solving the problem in the method is similar to that in the apparatus, the implementations of the apparatus and method can refer to each other, and the repeated description thereof will be omitted.

The embodiments of the present application may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in embodiments of the present application may be a device for providing the voice and/or data connectivity to the user, a handheld device with the wireless connection function, or other processing device connected to the wireless modem. In different systems, the terminal device may have different names. For example, in a 5G system, the terminal device may be referred to as User Equipment (UE). The wireless terminal device can communicate with one or more core networks via the RAN, and the wireless terminal device can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal device can also be called system, subscriber device, subscriber station, mobile station, mobile, remote station, access point, remote terminal, access terminal, user terminal, user agent, user device, which is not limited in the embodiments of the present application.

The network devices involved in embodiments of the present application include a base station and an LMP entity, where the base station may include a plurality of cells. Depending on specific application scenarios, the base station may also be called access point, or may refer to the device in the access network communicating with the wireless terminal via one or more sectors over the air interface or other names. The network device may be used to perform the inter-conversion between the received air frame and Internet Protocol (IP) packet, and used as the router between the wireless terminal device and the rest of the access network, where the rest of the access network may include IP networks. The network device can further coordinate the attribute management of the air interface. For example, the network device involved in the embodiments of the present application can be a network device (Base Transceiver Station (BTS)) in the Global System of Mobile communication (GSM) or Code Division Multiple Access (CDMA), or can be a network device (NodeB) in the Wideband Code Division Multiple Access (WCDMA), or can be an evolutional network device (evolutional Node B (eNB or e-NodeB)) in the Long Term Evolution (LTE) system, a 5G base station in the 5G network architecture (next generation system), or can be a Home evolved Node B (HeNB), a relay node, femto, pico, etc., which is not limited in the embodiments of the present application.

Embodiments of the present application will be described below in detail with reference to the drawings of the specification. It should be noted that the showing order of the embodiments of the present application only represents the sequential order of the embodiments, but does not represent the pros and cons of the solutions provided by the embodiments.

Embodiments of the present application propose an adaptive UE-specific downlink RS transmission method and apparatus based on the accuracy requirement on the positioning performance of the UE, the quality indication of the positioning measurement value and/or the decision result of the quality indication of the positioning measurement value.

Some embodiments of the present application includes a UE receives and measures a cell-specific downlink RS to obtain a first positioning measurement value, a quality indication of the first positioning measurement value and/or the decision result of the quality indication of the first positioning measurement value. The UE reports one or a combination of the following information to the network: the first positioning measurement value of the cell-specific downlink RS, the quality indication of the first positioning measurement value, the decision result of the quality indication of the first positioning measurement value or the actual positioning performance requirement of the UE; and applies to the network for the UE-specific RS resources that meet the actual positioning performance requirement of the UE. The UE receives and measures a UE-specific downlink RS configured by the network to obtain a second positioning measurement value, a quality indication of the second measurement value and/or the decision result of the quality indication of the second positioning measurement value, performs the algorithm processing based on the first positioning measurement value and the second positioning measurement value to obtain a third positioning measurement value, and reports it to the network for the network to locate the terminal.

Here, the cell-specific first downlink RS resource is determined by the network based on the lowest or medium positioning performance requirement of all UEs in the cell, and is generally sent periodically. The UE-specific second downlink RS is determined by the network based on the actual positioning performance requirement of the target UE, and is generally sent aperiodically.

The positioning measurement value includes one or a combination of: RSTD, UE Rx-Tx time difference, etc.

The quality indication of the positioning measurement value includes one or a combination of: Reference Signal Received Power (RSRP), Reference Signal Received Quality (RSRQ), Signal to Interference plus Noise Ratio (SINR), an error of the measurement value (for example: the resolution of a single measurement sample point, the standard deviation or variance of multiple measurement values), and the decision result of the quality indication of the positioning measurement value.

The downlink RS for the above measurement includes one or more of: NR PRS, CSI-RS, SSB.

The decision result of the quality indication of the first positioning measurement value may be calculated by the UE itself, or may be calculated on the network side. If it is calculated by the UE itself, the UE compares the quality indication of the first positioning measurement value with a threshold that is calculated according to the final positioning performance requirement of the UE or is pre-configured, to obtain the decision result of the quality indication of the positioning measurement value containing two states (that is, the decision results), where the "positive" state indicates that the quality indication of the first positioning measurement value satisfies the performance requirement; and the "negative" state indicates that the quality indication of the first positioning measurement value does not satisfy the performance requirement. Here, the decision result of the quality indication of the first positioning measurement value and the decision result of the quality indication of the second positioning measurement value are both related to the final positioning performance requirement of the UE, and the performance requirement of the measurement value needs to be higher than the final positioning performance requirement of the UE, for example: the measurement value error is less than 1/N of the final positioning error, where N is an integer greater than 1. If it is calculated on the network side, the UE needs to report the actual positioning performance requirement to the network side, and the network side uses the same criteria for calculation.

"The algorithm processing is performed based on the first positioning measurement value and the second positioning measurement value to obtain the third positioning measurement value", for example, the UE obtains the combined third positioning measurement value by using one of linear weighted sum and selective combination (for example: the combination is performed only when the decision result of the quality indication of the first positioning measurement value and the decision result of the quality indication of the second positioning measurement value are both the "positive" state) for the first positioning measurement value and the second positioning measurement value.

In some embodiments of the present application, the cell-specific RS specifically refers to a reference signal that can be obtained and measured for all terminals in the cell; and the UE-specific RS specifically refers to a reference signal that is sent for a specific terminal and that can be obtained and measured only by the specific terminal.

Implementation Solutions.

The specific solutions provided by the embodiments of the present application are as follows.

Terminal Side.
1. A UE receives the configuration information of the cell-specific RS resource notified by the network-side base station through broadcast signaling, or the UE receives the configuration information of the cell-specific RS resource notified by the network-side LMF entity through positioning NRPP signaling.
2. The UE calculates a first positioning measurement value and the quality indication of the first positioning measurement value and/or the decision result of the quality indication of the first positioning measurement value corresponding to the first positioning measurement value according to the configuration information of the cell-specific RS resource configured by the network-side LMF or the network-side base station and the cell-specific RS sent by the network-side base station, where the first positioning measurement value includes but not limited to: RSTD, UE Rx-Tx time difference, etc.; and the quality indication of the first positioning measurement value includes but not limited to: RSRP, RSRQ, SINR, measurement value error (for example: the resolution of a single measurement sample point, the standard deviation or variance of multiple measurement values). The reference signal for the above measurement includes: NR PRS and/or CSI-RS and/or SSB. The UE compares the quality indication of the first positioning measurement value with a pre-configured threshold value to obtain the decision result of the quality indication of the first positioning measurement value in one of "positive" and "negative" states, where the "positive" state indicates that the quality indication of the first positioning measurement value satisfies the performance requirement; and the "negative" state indicates that the quality indication of the first positioning measurement value does not satisfy the performance requirement. For example, if the quality indication of the first positioning measurement value is greater than the preset threshold value, the decision result of the quality indication of the first positioning measurement value is determined as the "positive" state; otherwise, the decision result of the quality indication of the first positioning measurement value is determined as the "negative" state, where the threshold value may be determined according to actual needs, which is not limited in the embodiments of the present application.
3. The UE reports the first positioning measurement value and the quality indication of the first positioning measurement value to the network-side LMF, or the UE reports the first positioning measurement value and the decision result of the quality indication of the first positioning measurement value.
4. The UE receives the configuration information of the UE-specific RS resource notified by the network-side base station through broadcast signaling, RRC signaling or DCI signaling, or the UE receives the configuration information of the UE-specific RS resource notified by the network-side LMF through positioning NRPP signaling.
5. The UE calculates a second positioning measurement value and the quality indication of the second positioning measurement value and/or the decision result of the quality indication of the second positioning measurement value according to the configuration information of the cell-specific RS resource configured by the network-side LMF or the network-side base station and the cell-specific RS sent by the network-side base station, where the second positioning measurement value includes but not limited to: RSTD, UE Rx-Tx time difference, etc.; and the quality indication of the second positioning measurement value includes but not limited to: RSRP, RSRQ, SINR, measurement value error (for example: standard deviation or variance of multiple measurement values). The reference signal for the above measurement includes: NR PRS and/or CSI-RS and/or SSB.
6. The UE obtains the final third positioning measurement value by linear weighted sum or obtains the final third positioning measurement value by selective combination for the first positioning measurement value and the second positioning measurement value, for example, the combination is performed only when the decision result of the quality indication of the first positioning measurement value and the decision result of the quality indication of the second positioning measurement value are both the "positive" state.
7. The UE reports the third positioning measurement value to the network-side LMF.

Network Side—Base Station.
1. The network-side base station receives the configuration information of the cell-specific RS resource of each cell sent by the LMF. If the network-side LMF does not directly notify the UE of the configuration information of the cell-specific RS resource, the network-side base station notifies the UE of the configuration information of the cell-specific RS resource through broadcast signaling.

Here, there are two methods for how the base station judges whether the LMF has notified the UE of the configuration information of the cell-specific RS resource. In the Method 1: the LMF informs the base station whether the configuration information of the cell-specific RS resource is notified to the UE; and in the Method 2: the protocol predefines that the LMF directly notifies the terminal of the configuration information of the cell-specific RS resource, or the protocol predefines that the LMF sends the configuration information of the cell-specific RS resource to the base station.

2. The network-side base station sends a cell-specific RS to all UEs in the cell.
3. The network-side base station receives the configuration information of the UE-specific RS resource for the target UE sent by the network-side LMF. If the network-side LMF does not directly notify the UE of the configuration information of the UE-specific RS resource, the network-side base station notifies the UE of the above configuration information of the UE-specific RS resource through broadcast signaling, RRC signaling or DCI signaling.

Here, there are two methods for how the base station judges whether the LMF has notified the UE of the configuration information of the UE-specific RS resource. In the Method 1: the LMF informs the base station whether the configuration information of the UE-specific RS resource is notified to the UE; and in the Method 2: the protocol predefines that the LMF directly notifies the terminal of the configuration information of the UE-specific RS resource, or the protocol predefines that the LMF sends the configuration information of the UE-specific RS resource to the base station.
  4. The network-side base station sends a UE-specific RS to the target UE.

Network Side—LMF.
  1. The network-side LMF notifies each base station of the configuration information of the cell-specific RS resource of each cell respectively, and the network-side LMF directly notifies the UE of the configuration information of the cell-specific RS resource through NRPP signaling.
  2. The network-side LMF performs the preliminary calculation of the UE position according to a first positioning measurement value and the quality indication of the first positioning measurement value or the decision result of the quality indication of the first positioning measurement value obtained based on the cell-specific RS measurement and reported by the UE, and reconfigures the UE-specific RS resource information.

In some embodiments, if the UE reports the decision result of the quality indication of the first positioning measurement value, the network-side LMF will directly perform the UE-specific RS resource configuration based on the decision result of the quality indication of the first positioning measurement value. If the UE reports the quality indication of the first positioning measurement value, the network-side LMF compares the quality indication of the first positioning measurement value of one or more cells reported by the UE with a predefined threshold to obtain the decision result of the quality indication of the first positioning measurement value: the "positive" state indicates that the quality indication of the first positioning measurement value satisfies the performance requirement; and the "negative" state indicates that the quality indication of the first positioning measurement value does not satisfy the performance requirement.

It should be noted that the UE-specific reference signal resource determined for the terminal is the first UE-specific reference signal resource when the decision result of the quality indication of the first positioning measurement value is the "negative" state; and the UE-specific reference signal resource determined for the terminal is the second UE-specific reference signal resource when the decision result of the quality indication of the first positioning measurement value is the "positive" state; where the first UE-specific reference signal resource is superior to the second UE-specific reference signal resource.

If the decision result of the quality indication of the first positioning measurement value is the "negative" state, the network-side LMF applies for the UE-specific RS resource with better measurement accuracy for the UE, for example: the RS resource occupies a larger bandwidth in the frequency domain and/or occupies a larger number of OFDM symbols in the time domain; if the decision result of the quality indication of the first positioning measurement value is the "positive" state, the network-side LMF applies for the UE-specific RS resource with the second best measurement accuracy for the UE, for example: the RS resource occupies a smaller bandwidth in the frequency domain and/or occupies a smaller number of OFDM symbols in the time domain.
  3. The network-side LMF notifies each base station of the above configuration information of the UE-specific RS resource through positioning NRPPa signaling, and can also directly notify the UE through positioning NRPP signaling.
  4. The network-side LMF calculates the final position of the UE according to the third positioning measurement value reported by the terminal.

The introduction of several specific embodiments will be given below.

Embodiment 1: OTDOA positioning scheme–the UE reports RSTD measurement value+measurement value quality indication RSRP to the LMF.

The Embodiment 1 is a positioning scheme based on the OTDOA, where:
  the UE reports the RSTD measurement value and the measurement value quality indication RSRP to the LMF.

The UE receives the configuration information of the cell-specific and UE-specific RS resources notified by the network-side LMF through positioning NRPP signaling.

The RS reference signal for the above measurement is an NR PRS.

Terminal Side.
  1. A UE receives the configuration information of the cell-specific PRS resource notified by the network-side LMF through positioning NRPP signaling.
  2. The UE calculates a positioning measurement value RSTD 1 and the corresponding quality indication RSRP 1 of the positioning measurement value according to the configuration information of the cell-specific PRS resource configured by the network-side LMF or the network-side base station and the cell-specific PRS sent by the network-side base station.
  3. The UE reports the positioning measurement value RSTD 1 and the quality indication RSRP 1 of the positioning measurement value to the network-side LMF.
  4. The UE receives the configuration information of the UE-specific PRS resource notified by the network-side LMF through positioning NRPP signaling.
  5. The UE calculates the positioning measurement value RSTD 2 and the quality indication RSRP 2 of the positioning measurement value according to the configuration information of the UE-specific PRS resource notified by the network-side LMF and the UE-specific PRS sent by the network-side base station.
  6. The UE obtains the final positioning measurement value RSTD 3 by selective combination for the positioning measurement value RSTD 1 and the positioning measurement value RSTD 2, and specifically, compares the quality indication RSRP 1 of the positioning measurement value with the quality indication RSRP 2 of the positioning measurement value and selects the positioning measurement value corresponding to the larger value. For example: RSRP 2>RSRP 1, RSTD3=RSTD2 is selected.
  7. The UE reports the positioning measurement value RSTD3 to the network-side LMF.

Network Side—Base Station.
  1. The network-side base station receives the configuration information of the cell-specific PRS resource of each cell sent by the LMF. If the network-side LMF does not directly notify the UE of the configuration information of the cell-specific PRS resource, the network-side base station notifies the UE of the configuration information of the cell-specific PRS resource through broadcast signaling.
  2. The network-side base station sends a cell-specific PRS to all UEs in the cell.
  3. The network receives the configuration information of the UE-specific PRS resource for each cell of the target UE sent by the LMF. If the network-side LMF does not directly notify the UE of the configuration information of the UE-specific PRS resource, the network-side base station notifies the UE of the above configuration information of the UE-specific PRS resource through broadcast signaling, RRC signaling or DCI signaling.
4. The network-side base station sends a UE-specific PRS to the target UE.

Network Side—LMF.
1. The network-side LMF notifies each base station of the configuration information of the cell-specific PRS resource of each cell respectively, and the network-side LMF may also directly notify the UE of the configuration information of the cell-specific PRS resource through positioning NRPP signaling.
2. The network-side LMF performs the preliminary calculation of the UE position according to the positioning measurement value RSTD 1 and the quality indication RSRP 1 of the positioning measurement value based on the cell-specific PRS reported by the UE, and reconfigures the UE-specific PRS resource information.

In some embodiments, since the UE reports the quality indication RSRP 1 of the positioning measurement value, the network-side LMF compares the quality indications RSRP 1 of the positioning measurement values of multiple cells reported by the UE with a predefined RSRP threshold to obtain the decision result of the quality indication of the first positioning measurement value in one of two states, where the "positive" state indicates that the quality indication of the first positioning measurement value satisfies the performance requirement; and the "negative" state indicates that the quality indication of the first positioning measurement value does not satisfy the performance requirement. Assuming RSRP1<RSPR threshold, then the decision result of the quality indication of the first positioning measurement value corresponds to the "negative" state. The network-side LMF applies for the UE-specific RS resource with better measurement accuracy for the UE. For example, the RS resource occupies a larger bandwidth in the frequency domain and/or occupies a larger number of OFDM symbols in the time domain.

3. The network-side LMF notifies each base station of the above configuration information of the UE-specific RS resource through positioning NRPPa signaling, and directly notifies the UE through positioning NRPP signaling.
4. The network-side LMF calculates the position of the UE according to the third positioning measurement value reported by the terminal.

Figure 2:
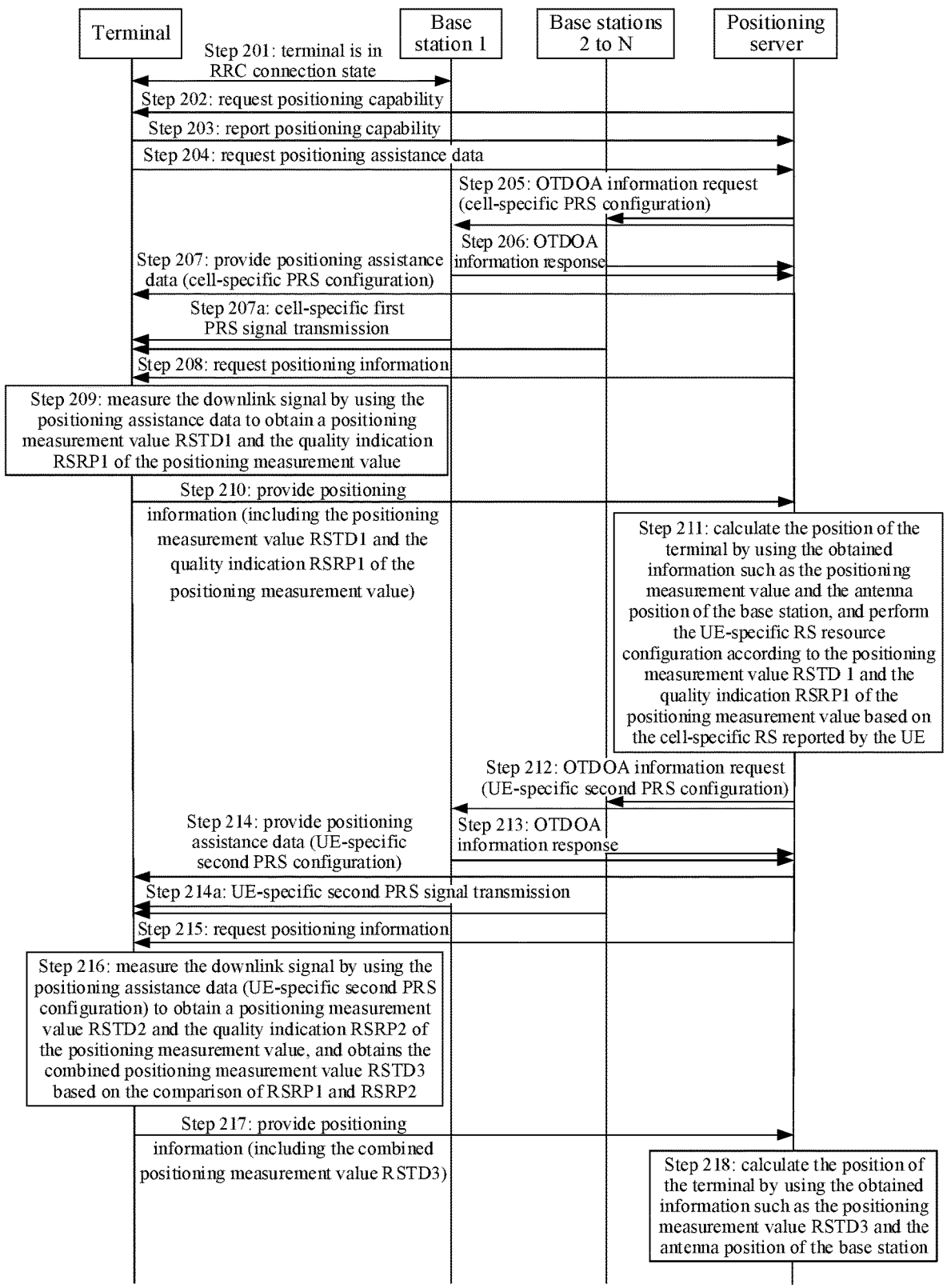
FIG. 2 is a schematic diagram of a positioning process according to an embodiment of the present application.

As shown in FIG. 2, the steps of the Embodiment 1 will be introduced below.

Steps 201 to 204 are the same as the steps 101 to 104 of the flow as shown in FIG. 1.

Step 205: the positioning server sends an "OTDOA information request (NRPPa OTDOA INFORMATION REQUEST)" message to a Base Station (BS), where this message requests the BS to provide the downlink positioning assistance data, including the configuration information of the cell-specific PRS, where the PRS signal configuration information includes PRS time-frequency resources, PRS pattern, PRS sequence and other information.

The base stations include base station 1, base station 2 . . . base station N.

Step 206: the base station returns an OTDOA information response to the positioning server.

Step 207: the positioning server provides the positioning assistance data requested by the UE in the "provide positioning assistance data" message, which carries the cell-specific PRS configuration.

Step 207a: all BSs send the cell-specific PRS signals to the UE.

Steps 208 to 209 are the same as the steps 108 to 109 of the flow as shown in FIG. 1.

Step 210: the UE provides the LMF with the positioning information, including the first positioning measurement value RSTD1 and the quality indication RSRP1 of the first positioning measurement value.

Step 211: the LMF calculates the position of the terminal by using the obtained information such as the positioning measurement value and the antenna position of the base station, and the LMF determines the configuration information of the UE-specific PRS resource according to the first positioning measurement value RSTD 1 and the quality indication RSRP1 of the first positioning measurement value based on the cell-specific PRS reported by the UE.

Step 212: the positioning server (i.e., the LMF entity) sends an "OTDOA information request (request for the configuration information of the UE-specific PRS resource)" message to the BS.

Step 213: the BS sends an "OTDOA information response (carrying the configuration information of the UE-specific PRS resource)" message to the positioning server.

Step 214: the positioning server provides the positioning assistance data (including the configuration information of the UE-specific PRS resource) to the UE.

Step 214a: all BSs send the UE-specific PRS signals to the UE.

Step 215: the positioning server sends a "request positioning information" message to the UE.

Step 216: the UE measures the downlink signal by using the positioning assistance data (the configuration information of the UE-specific PRS resource) to obtain the second positioning measurement value RSTD2 and the quality indication RSRP2 of the second positioning measurement value, and obtains the combined third positioning measurement value RSTD3 based on the comparison of RSRP1 and RSRP2. Specifically, the quality indication RSRP 1 of the positioning measurement value is compared with the quality indication RSRP 2 of the positioning measurement value, and the positioning measurement value corresponding to the larger value is selected. For example: RSRP 2>RSRP 1, RSTD3=RSTD2 is selected.

Step 217: the UE provides the positioning information (including the positioning measurement value RSTD3) to the LMF.

Step 218: the LMF calculates the position of the terminal by using the obtained information such as the positioning measurement value RSTD3 and the antenna position of the base station.

Embodiment 2: E-CID positioning scheme–the UE reports the measurement value of the UE receiving-transmitting time difference of the target base station+the measurement value quality indication SINR to the LMF.

The Embodiment 2 is a positioning scheme based on the E-CID, and the main difference from the Embodiment 1 is as following.

The UE reports the measurement value of the UE receiving-transmitting time difference and the measurement value quality indication SINR to the LMF.

The UE receives the configuration information of the cell-specific resource notified by the network-side LMF through positioning NRPP signaling.

The UE receives the configuration information of the UE-specific PRS resource notified by the network-side base station through broadcast signaling, Radio Resource Control (RRC) signaling or Downlink Control Information (DCI) signaling.

The cell-specific RS for the above measurement includes an NR SSB, and the UE-specific RS includes an NR PRS.

Terminal Side.
1. A UE receives the configuration information of the cell-specific SSB resource notified by the network-side LMF through positioning NRPP signaling.
2. The UE calculates a positioning measurement value "UE receiving-transmitting time difference 1" and the quality indication SINR 1 corresponding to the positioning measurement value according to the configuration information of the cell-specific SSB resource configured by the network-side LMF or the network-side base station and the cell-specific SSB sent by the network-side base station.
3. The UE reports the positioning measurement value "UE receiving-transmitting time difference 1" and the quality indication SINR 1 of the positioning measurement value to the network-side LMF.
4. The UE receives the configuration information of the UE-specific PRS resource notified by the network-side base station through broadcast signaling, RRC signaling or DCI signaling.
5. The UE calculates a positioning measurement value "UE receiving-transmitting time difference 2" and the quality indication SINR 2 of the positioning measurement value according to the configuration information of the UE-specific PRS resource notified by the network-side base station and the UE-specific PRS sent by the network-side base station.
6. The UE obtains the final positioning measurement value "UE receiving-transmitting time difference 3" by selective combination for the positioning measurement value "UE receiving-transmitting time difference 1" and the positioning measurement value "UE receiving-transmitting time difference 2", and in some embodiments, compares the quality indication SINR 1 of the positioning measurement value with the quality indication SINR 2 of the positioning measurement value and selects the positioning measurement value corresponding to the larger value. For example: SINR 2>SINR 1, UE receiving-transmitting time difference 3=UE receiving-transmitting time difference 2 is selected.
7. The UE reports the combined positioning measurement value "UE receiving-transmitting time difference 3" to the network-side LMF.

Network Side—Base Station.
1. The network-side base station receives the configuration information of the cell-specific SSB resource of each cell sent by the LMF.
2. The network-side base station sends a cell-specific SSB to all UEs in the cell.
3. The network-side base station receives the configuration information of the UE-specific PRS resource for the target UE sent by the network-side LMF. Since the network-side LMF does not directly notify the UE of the configuration information of the UE-specific PRS resource, the network-side base station notifies the UE of the above configuration information of the UE-specific PRS resource through broadcast signaling, RRC signaling or DCI signaling.
4. The network-side base station sends a UE-specific PRS to the target UE.

Network Side—LMF.
1. The network-side LMF notifies each base station of the configuration information of the cell-specific SSB resource of each cell respectively, and the network-side LMF directly notifies the UE of the configuration information of the cell-specific SSB resource through positioning NRPP signaling.
2. The network-side LMF performs the UE-specific PRS resource configuration according to the positioning measurement value "UE receiving-transmitting time difference 1" and the quality indication SINR 1 of the positioning measurement value based on the cell-specific SSB reported by the UE.

In some embodiments, since the UE reports the quality indication SINR 1 of the positioning measurement value, the network-side LMF compares the quality indications SINR 1 of the positioning measurement values of multiple cells reported by the UE with a predefined SINR threshold to obtain the decision result of the quality indication of the first positioning measurement value, where the "positive" state indicates that the quality indication SINR 1 of the positioning measurement value satisfies the performance requirement; and the "negative" state indicates that the quality indication SINR 1 of the positioning measurement value does not satisfy the performance requirement. Assuming SINR1<SINR threshold, then the decision result of the quality indication of the first positioning measurement value corresponds to the "negative" state. The network-side LMF applies for the UE-specific RS resource with better measurement accuracy for the UE. For example, the RS resource occupies a larger bandwidth in the frequency domain and/or occupies a larger number of OFDM symbols in the time domain.

3. The network-side LMF notifies each base station of the above configuration information of the UE-specific PRS resource through positioning NRPPa signaling, and directly notifies the UE through positioning NRPP signaling.
4. The network-side LMF calculates the position of the UE according to the positioning measurement value "UE receiving-transmitting time difference 3" reported by the terminal.

Figure 3:
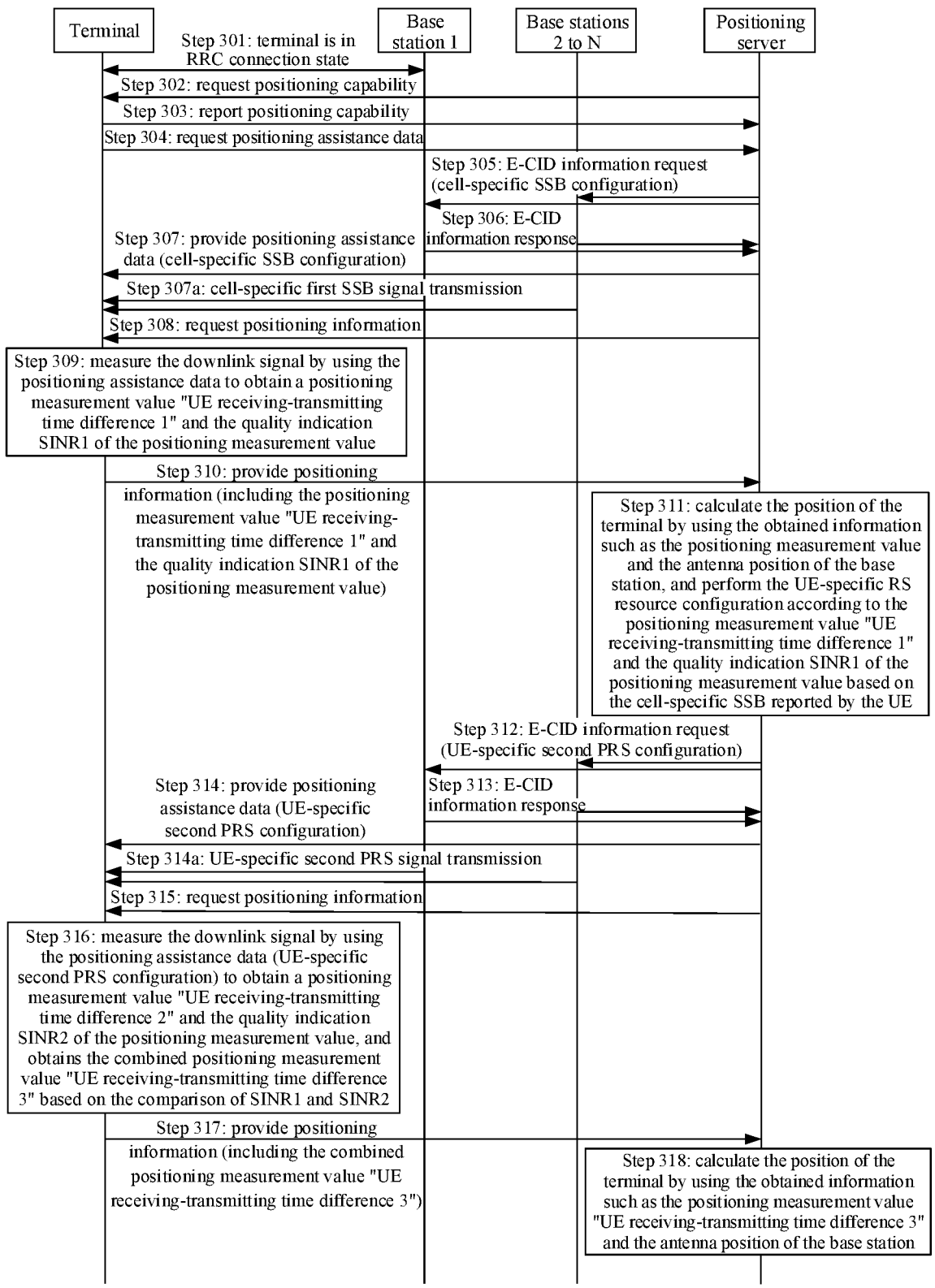
FIG. 3 is a schematic diagram of another positioning process according to an embodiment of the present application.

As shown in FIG. 3, the steps of the Embodiment 2 will be introduced below.

Steps 301 to 304 are the same as the steps 101 to 104 of the flow as shown in FIG. 1.

Step 305: the positioning server sends an "E-CID information request (NRPPa E-CIDINFORMATION REQUEST)" message to a BS, where this message requests the BS to provide the downlink positioning assistance data including the configuration information of the cell-specific SSB resource, and the configuration information of the cell-specific SSB resource includes SSB time-frequency resources, SSB pattern, SSB sequence and other information.

Step 306: each base station replies an E-CID information response to the positioning server.

Step 307: the positioning server provides the positioning assistance data requested by the UE in the "provide positioning assistance data" message, which carries the configuration information of the cell-specific SSB resource.

Step 307a: all BSs send the cell-specific SSB signals to the UE.

Steps 308 to 309 are the same as the steps 108 to 109 in FIG. 1.

Step 310: the UE provides the LMF with the positioning information, including the positioning measurement value "UE receiving-transmitting time difference 1" and the quality indication SINR1 of the positioning measurement value.

Step 311: the LMF calculates the position of the terminal by using the obtained information such as the positioning measurement value and the antenna position of the base station, and the LMF determines the configuration information of the UE-specific PRS resource according to the positioning measurement value "UE receiving-transmitting time difference 1" and the quality indication SINR1 of the positioning measurement value based on the cell-specific SSB reported by the UE.

Step 312: the positioning server sends an "E-CID information request (request for the configuration information of the UE-specific PRS resource)" message to the BS.

Step 313: the BS sends an "E-CID information response (carrying the configuration information of the UE-specific PRS resource)" message to the positioning server.

Step 314: the positioning server provides the positioning assistance data (including the configuration information of the UE-specific PRS resource) to the UE.

Step 314a: all BSs send the UE-specific second PRS signals to the UE.

Step 315: the positioning server sends a "request positioning information" message to the UE.

Step 316: the UE measures the downlink signal by using the positioning assistance data (the configuration information of the UE-specific second PRS) to obtain the positioning measurement value "UE receiving-transmitting time difference 2" and the quality indication SINR2 of the positioning measurement value, and obtains the combined positioning measurement value "UE receiving-transmitting time difference 3" based on the comparison of SINR1 and SINR2. Specifically, the quality indication SINR 1 of the positioning measurement value is compared with the quality indication SINR 2 of the positioning measurement value, and the positioning measurement value corresponding to the larger value is selected. For example: SINR 2>SINR 1, UE receiving-transmitting time difference 3=UE receiving-transmitting time difference 2 is selected.

Step 317: the UE provides the positioning information (including the positioning measurement value "UE receiving-transmitting time difference 3") to the LMF.

Step 318: the LMF calculates the position of the terminal by using the obtained information such as the positioning measurement value and the antenna position of the base station.

Embodiment 3: Multi-RTT positioning scheme–the UE reports the measurement value of UE receiving-transmitting time difference+the measurement value quality indication RSRP+the decision result of the measurement value quality indication RSRP of the candidate base station to the LMF.

The Embodiment 3 is a positioning scheme based on Multi-RTT, where:

the UE reports the measurement value of UE receiving-transmitting time difference, the measurement value quality indication RSRP and the decision result of the measurement value quality indication RSRP of each candidate base station to the LMF;

the UE receives the configuration information of the cell-specific and UE-specific RS resources notified by the network-side LMF through positioning NRPP signaling.

The RS for the above measurement may be an NR PRS.

Terminal Side.

1. A UE receives the configuration information of the cell-specific PRS resource notified by the network-side LMF through positioning NRPP signaling.
2. The UE calculates a positioning measurement value "UE receiving-transmitting time difference 1", the quality indication RSRP 1 of the positioning measurement value and the decision result 1 of the quality indication RSRP of the positioning measurement value according to the configuration information of the cell-specific PRS resource configured by the network-side LMF or the network-side base station and the cell-specific PRS sent by the network-side base station.

In some embodiments, the UE compares the quality indication RSRP 1 of the positioning measurement value of multiple cells measured by the UE with a predefined RSRP threshold to obtain the decision result 1 of the quality indication RSRP of the positioning measurement value, where the "positive" state indicates that the quality indication RSRP 1 of the positioning measurement value satisfies the performance requirement; and the "negative" state indicates that the quality indication RSRP 1 of the positioning measurement value does not satisfy the performance requirement. Assuming RSRP1 for base station i<RSPR threshold, then the decision result 1 of the quality indication RSRP of the positioning measurement value corresponds to the "negative" state.

3. The UE reports the positioning measurement value "UE receiving-transmitting time difference 1", the quality indication RSRP 1 of the positioning measurement value and the decision result 1 of the quality indication RSRP of the positioning measurement value to the network-side LMF.
4. The UE receives the configuration information of the UE-specific PRS resource notified by the network-side LMF through positioning NRPP signaling.
5. The UE calculates a positioning measurement value "UE receiving-transmitting time difference 2" and the quality indication RSRP 2 of the positioning measurement value according to the configuration information of the UE-specific RS resource notified by the network-side LMF and the UE-specific PRS sent by the network-side base station.
6. The UE obtains the final positioning measurement value "UE receiving-transmitting time difference 3" by selective combination for the positioning measurement value "UE receiving-transmitting time difference 1" and the positioning measurement value "UE receiving-transmitting time difference 2", and specifically, compares the quality indication RSRP 1 of the positioning measurement value with the quality indication RSRP 2 of the positioning measurement value and selects the positioning measurement value corresponding to the larger value. For example: RSRP 2>RSRP 1, UE receiving-transmitting time difference 3=UE receiving-transmitting time difference 2 is selected.
7. The UE reports the combined positioning measurement value "UE receiving-transmitting time difference 3" to the network-side LMF.

Network Side—Base Station.
1. The network-side base station receives the configuration information of the cell-specific PRS resource of each cell sent by the LMF. If the network-side LMF does not directly notify the UE of the configuration information of the cell-specific PRS resource, the network-side base station notifies the UE of the configuration information of the cell-specific PRS resource through broadcast signaling.
2. The network-side base station sends a cell-specific PRS to all UEs in the cell.
3. The network receives the configuration information of the UE-specific PRS resource for each cell of the target UE sent by the LMF. If the network-side LMF does not directly notify the UE of the configuration information of the UE-specific PRS resource, the network-side base station notifies the UE of the above configuration information of the UE-specific PRS resource through broadcast signaling, RRC signaling or DCI signaling.
4. The network-side base station sends a UE-specific PRS to the target UE.

Network Side—LMF.
1. The network-side LMF notifies each base station of the configuration information of the cell-specific PRS resource of each cell respectively, and the network-side LMF directly notifies the UE of the configuration information of the cell-specific PRS resource through positioning NRPP signaling.
2. The network-side LMF performs the preliminary calculation of the UE position according to the positioning measurement value "UE receiving-transmitting time difference 1", the quality indication RSRP 1 of the positioning measurement value and the decision result 1 of the quality indication RSRP of the positioning measurement value based on the cell-specific PRS reported by the UE, and re-determines the configuration information of the UE-specific PRS resource.
3. The network-side LMF notifies each base station of the above configuration information of the UE-specific PRS resource through positioning NRPPa signaling, and directly notifies the UE through positioning NRPP signaling.
4. The network-side LMF calculates the position of the UE according to the third positioning measurement value reported by the terminal.

Figure 4:
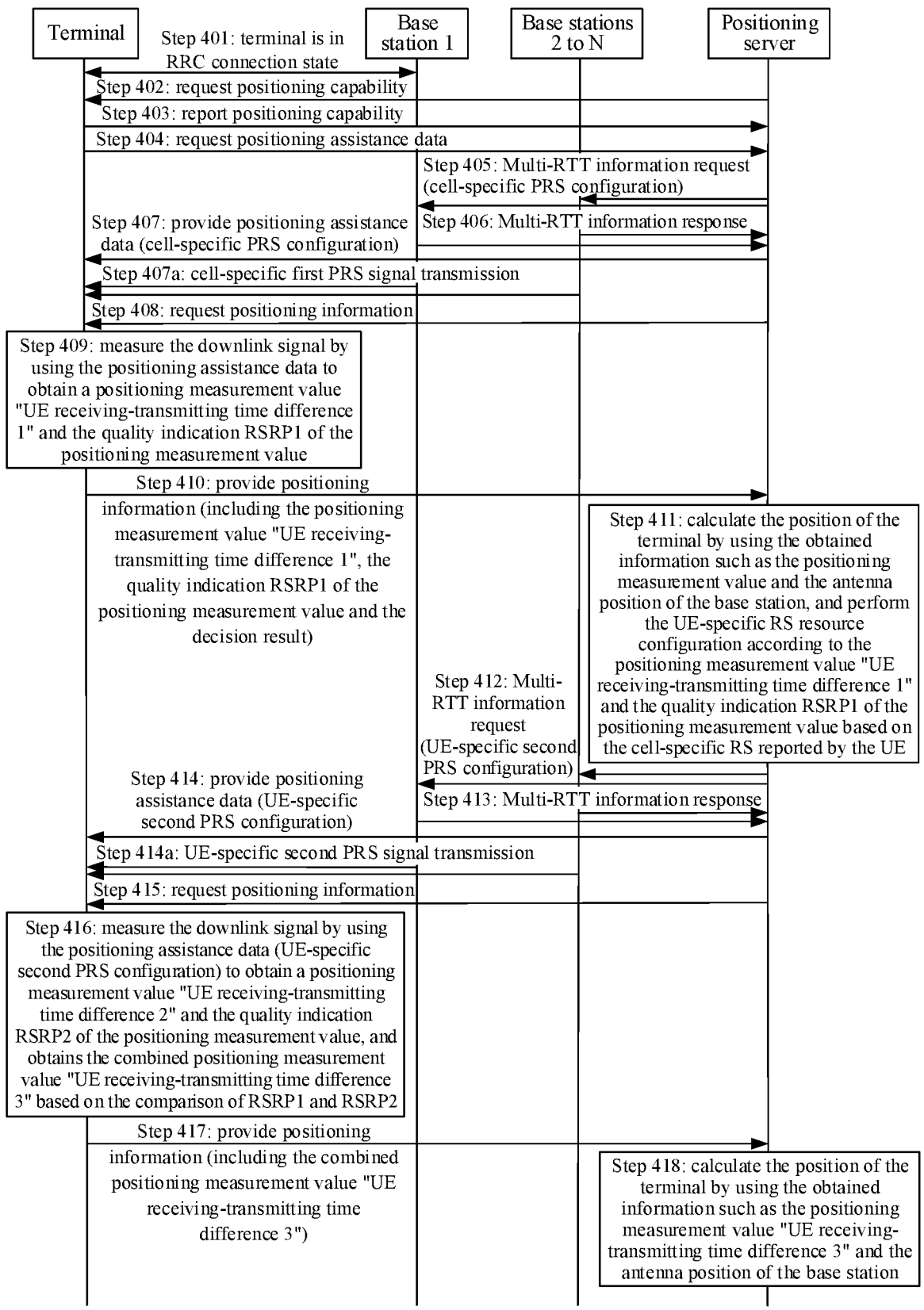
FIG. 4 is a schematic diagram of a third positioning process according to an embodiment of the present application.

As shown in FIG. 4, the steps of the Embodiment 3 will be introduced below.

Steps 401 to 404 are the same as the steps 101 to 104 in FIG. 1.

Step 405: the positioning server sends a "Multi-RTT information request (NRPPa Multi-RTT INFORMATION REQUEST)" message to a BS, where this message requests the BS to provide the downlink positioning assistance data, including the configuration information of the cell-specific PRS resource, where the PRS resource configuration information includes PRS time-frequency resources, PRS pattern, PRS sequence and other information.

Step 406: each base station feeds back a Multi-RTT information response to the positioning server.

Step 407: the positioning server provides the positioning assistance data requested by the UE in the "provide positioning assistance data" message, which carries the configuration information of the cell-specific PRS resource.

Step 407a: all BSs send the cell-specific PRS signals to the UE.

Steps 408 to 409 are the same as the steps 108 to 109 in FIG. 1.

Step 410: the UE provides the LMF with the positioning information, including the positioning measurement value "UE receiving-transmitting time difference 1", the quality indication RSRP 1 of the positioning measurement value and the decision result 1 of the quality indication RSRP of the positioning measurement value.

Step 411: the LMF calculates the position of the terminal by using the obtained information such as the positioning measurement value and the antenna position of the base station, and the LMF determines the configuration information of the UE-specific RS resource according to the positioning measurement value "UE receiving-transmitting time difference 1", the quality indication RSRP 1 of the positioning measurement value and the decision result 1 of the quality indication RSRP of the positioning measurement value based on the cell-specific RS reported by the UE.

Step 412: the positioning server sends a "Multi-RTT information request (request for the configuration information of the UE-specific PRS resource)" message to the BS.

Step 413: the BS sends a "Multi-RTT information response (carrying the configuration information of the UE-specific PRS resource)" message to the positioning server.

Step 414: the positioning server provides the positioning assistance data (carrying the configuration information of the UE-specific PRS resource) to the UE.

Step 414a: all BSs send the UE-specific PRSs to the UE.

Step 415: the positioning server sends a "request positioning information" message to the UE.

Step 416: the UE measures the downlink signal by using the positioning assistance data (the configuration information of the UE-specific PRS resource) to obtain the positioning measurement value "UE receiving-transmitting time difference 2" and the quality indication RSRP2 of the positioning measurement value, and obtains the positioning measurement value "UE receiving-transmitting time difference 3" based on the comparison of RSRP1 and RSRP2. Specifically, the quality indication RSRP 1 of the positioning measurement value is compared with the quality indication RSRP 2 of the positioning measurement value, and the positioning measurement value corresponding to the larger value is selected. For example: RSRP 2>RSRP 1, UE receiving-transmitting time difference 3=UE receiving-transmitting time difference 2 is selected.

Step 417: the UE provides the positioning information (including the positioning measurement value "UE receiving-transmitting time difference 3") to the LMF.

Step 418: the LMF calculates the position of the terminal by using the obtained information such as the positioning measurement value and the antenna position of the base station.

Figure 5:
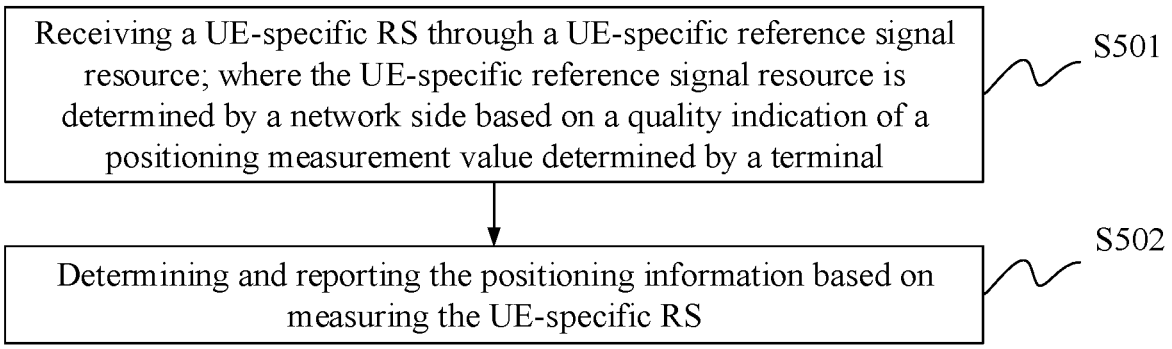
FIG. 5 is a schematic flowchart of a signal transmission method on the terminal side according to an embodiment of the present application.

In summary, referring to FIG. 5, on the terminal side, a signal transmission method provided by an embodiment of the present application includes:

S501: receiving a UE-specific RS through a UE-specific reference signal resource; where the UE-specific reference signal resource is determined by a network side based on a quality indication of a positioning measurement value determined by a terminal;

S502: determining and reporting the positioning information based on measuring the UE-specific RS.

Through this method, the UE-specific RS is received through the UE-specific reference signal resource; where the UE-specific reference signal resource is determined by the network side based on the quality indication of the positioning measurement value determined by the terminal; and the positioning information is determined and reported based on measuring the UE-specific RS, implementing the reference signal transmission of the adaptive UE-specific RS resource configuration based on the quality indication of the positioning measurement value.

In one embodiment, the quality indication of the positioning measurement value is determined by following steps:
  obtaining the configuration information of cell-specific reference signal resources;
  receiving a cell-specific RS according to the configuration information of cell-specific reference signal resources;
  determining a first positioning measurement value by measuring the cell-specific RS, and determining a quality indication of the first positioning measurement value and/or a decision result of the quality indication of the first positioning measurement value.

In one embodiment, determining the decision result of the quality indication of the first positioning measurement value, includes:
  determining a decision result of whether the quality indication of the first positioning measurement value satisfies a performance requirement by comparing the quality indication of the first positioning measurement value with a preset threshold value.

In one embodiment, the UE-specific reference signal resource is determined by the network side based on a first positioning measurement value and a quality indication of the first positioning measurement value or the first positioning measurement value and a decision result of the quality indication of the first positioning measurement value reported by the terminal.

In one embodiment, determining and reporting the positioning information based on measuring the UE-specific RS, includes:
  determining a second positioning measurement value by measuring the UE-specific RS;
  determining a quality indication of the second positioning measurement value and/or a decision result of the quality indication of the second positioning measurement value according to the second positioning measurement value;
  determining and reporting a third positioning measurement value based on a first positioning measurement value obtained by measuring a cell-specific RS and the second positioning measurement value.

In one embodiment, the method further includes: determining a quality indication of the second positioning measurement value and/or a decision result of the quality indication of the second positioning measurement value according to the second positioning measurement value;
  determining the third positioning measurement value based on the first positioning measurement value and the second positioning measurement value, includes:
  processing the first positioning measurement value and the second positioning measurement value according to the quality indication of the first positioning measurement value and/or the decision result of the quality indication of the first positioning measurement value as well as the quality indication of the second positioning measurement value and/or the decision result of the quality indication of the second positioning measurement value, to determine the third positioning measurement value.

In one embodiment, any one of the RSs includes one or a combination of: NR PRS, CSI-RS, SSB.

In one embodiment, configuration information of any one of the reference signal resources is obtained through one or a combination of:
  broadcast signaling;
  RRC signaling;
  DCI signaling;
  NRPP signaling.

In one embodiment, any one of the positioning measurement values includes at least one or a combination of: RSTD, terminal receiving-transmitting time difference.

In one embodiment, any one of the quality indications of the positioning measurement values includes at least one or a combination of: RSRP, RSRQ, SINR, an error of a measurement value; a decision result of a quality indication of a positioning measurement value.

Figure 6:
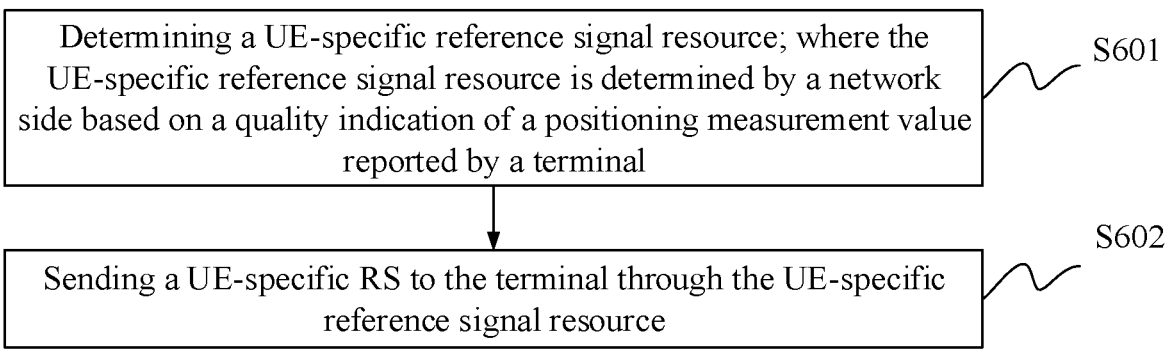
FIG. 6 is a schematic flowchart of a signal transmission method on the base station side according to an embodiment of the present application.

On the base station side, referring to FIG. 6, a signal transmission method provided by an embodiment of the present application includes followings.
  S601: determining a UE-specific reference signal resource; where the UE-specific reference signal resource is determined by a network side based on a quality indication of a positioning measurement value reported by a terminal.

For example, the UE-specific reference signal resource is determined through the configuration information of the UE-specific reference signal resource sent by the LMF entity.
  S602: sending a UE-specific RS to the terminal through the UE-specific reference signal resource.

In one embodiment, the method further includes:
  determining a cell-specific reference signal resource; for example, determining the cell-specific reference signal resource through the configuration information of the cell-specific reference signal resource sent by the LMF entity;
  sending a cell-specific RS to the terminal through the cell-specific reference signal resource.

In one embodiment, the UE-specific reference signal resource and/or the cell-specific reference signal resource is/are determined by receiving configuration information sent by an LMF.

In one embodiment, the method further includes:
  notifying the terminal of configuration information of the UE-specific reference signal resource and/or the cell-specific reference signal resource through broadcast signaling, RRC signaling or DCI signaling.

Figure 7:
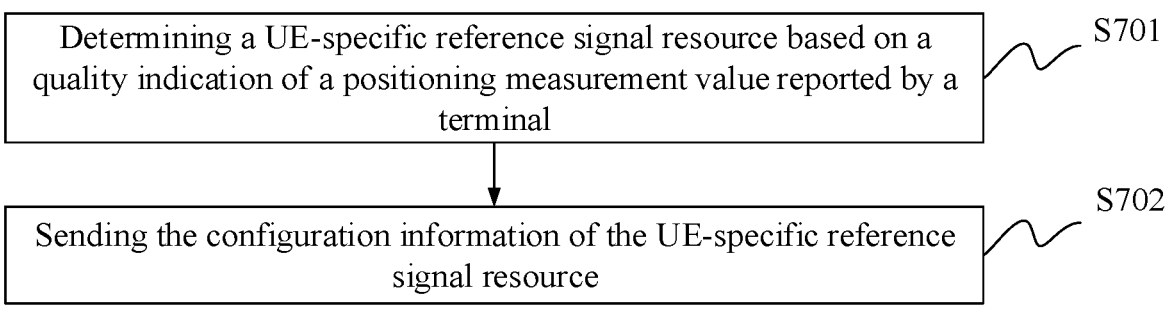
FIG. 7 is a schematic flowchart of a signal transmission method on the LMF entity side according to an embodiment of the present application.

Correspondingly, referring to FIG. 7, on the LMF side, a signal transmission method provided by an embodiment of the present application includes:
  S701: determining a UE-specific reference signal resource based on a quality indication of a positioning measurement value reported by a terminal;
  S702: sending the configuration information of the UE-specific reference signal resource.

In one embodiment, determining the UE-specific reference signal resource based on the quality indication of the positioning measurement value reported by the terminal, includes:
  if a quality indication of a first positioning measurement value reported by the terminal is received, then determining a decision result of whether the quality indication of the first positioning measurement value satisfies a performance requirement by comparing the quality indication of the first positioning measurement value with a preset threshold value, and determining the UE-specific reference signal resource according to the decision result;

if a decision result of a quality indication of a first positioning measurement value reported by the terminal is received, then determining the UE-specific reference signal resource directly according to the decision result, where the decision result represents whether the quality indication of the first positioning measurement value satisfies a performance requirement.

In one embodiment, the UE-specific reference signal resource determined for the terminal is a first UE-specific reference signal resource when the decision result indicates that the quality indication of the first positioning measurement value does not satisfy the performance requirement, and the UE-specific reference signal resource determined for the terminal is a second UE-specific reference signal resource when the decision result indicates that the quality indication of the first positioning measurement value satisfies the performance requirement;

a frequency-domain bandwidth occupied by the first UE-specific reference signal resource is greater than a frequency-domain bandwidth occupied by the second UE-specific reference signal resource, and/or a quantity of time-domain OFDM symbols occupied by the first UE-specific reference signal resource is greater than a quantity of time-domain OFDM symbols occupied by the second UE-specific reference signal resource.

In one embodiment, the method further includes: receiving a third positioning measurement value reported by the terminal, and determining a position of the terminal.

Figure 8:
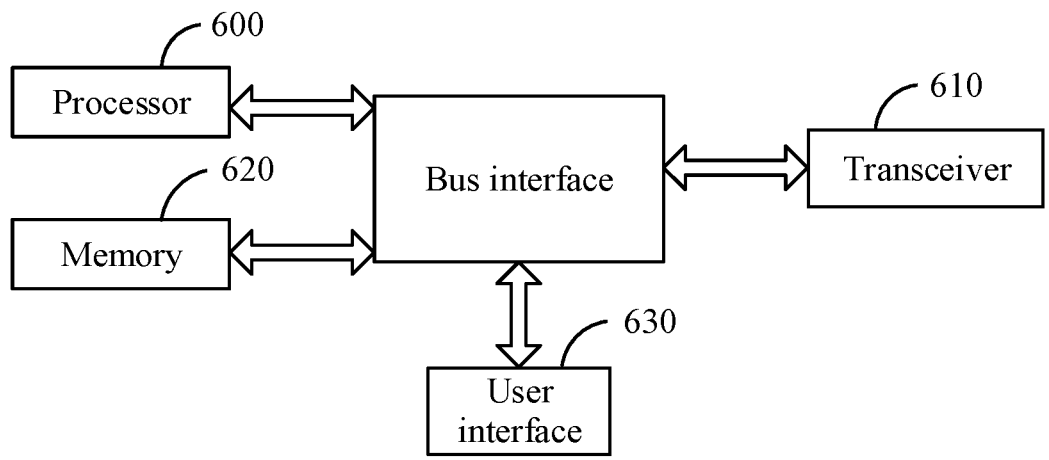
FIG. 8 is a structural schematic diagram of a signal transmission apparatus on the terminal side according to an embodiment of the present application.

On the terminal side, referring to FIG. 8, a signal transmission apparatus provided by an embodiment of the present application includes:

a memory 620 configured to store program instructions;

a processor 600 configured to invoke the program instructions stored in the memory, and in accordance with the obtained program, perform the process of:

receiving a UE-specific RS through a UE-specific reference signal resource; where the UE-specific reference signal resource is determined by a network side based on a quality indication of a positioning measurement value determined by a terminal;

determining and reporting positioning information based on measuring the UE-specific RS.

In one embodiment, the quality indication of the positioning measurement value is determined by following steps:

obtaining configuration information of cell-specific reference signal resources;

receiving a cell-specific RS according to the configuration information of cell-specific reference signal resources;

determining a first positioning measurement value by measuring the cell-specific RS, and determining a quality indication of the first positioning measurement value and/or a decision result of the quality indication of the first positioning measurement value.

In one embodiment, determining the decision result of the quality indication of the first positioning measurement value, includes:

determining a decision result of whether the quality indication of the first positioning measurement value satisfies a performance requirement by comparing the quality indication of the first positioning measurement value with a preset threshold value.

In one embodiment, the UE-specific reference signal resource is specifically determined by the network side based on a first positioning measurement value and a quality indication of the first positioning measurement value or the first positioning measurement value and a decision result of the quality indication of the first positioning measurement value reported by the terminal.

In one embodiment, determining and reporting the positioning information based on measuring the UE-specific RS, includes:

determining a second positioning measurement value by measuring the UE-specific RS;

determining a quality indication of the second positioning measurement value and/or a decision result of the quality indication of the second positioning measurement value according to the second positioning measurement value;

determining and reporting a third positioning measurement value based on a first positioning measurement value obtained by measuring a cell-specific RS and the second positioning measurement value.

In one embodiment, the processor 600 is further configured to: determine a quality indication of the second positioning measurement value and/or a decision result of the quality indication of the second positioning measurement value according to the second positioning measurement value;

determining the third positioning measurement value based on the first positioning measurement value and the second positioning measurement value, specifically includes:

processing the first positioning measurement value and the second positioning measurement value according to the quality indication of the first positioning measurement value and/or the decision result of the quality indication of the first positioning measurement value as well as the quality indication of the second positioning measurement value and/or the decision result of the quality indication of the second positioning measurement value, to determine the third positioning measurement value.

In one embodiment, any one of the RSs includes one or a combination of: NR PRS, CSI-RS, SSB.

In one embodiment, the processor 600 obtains the configuration information of any one of the reference signal resources through one or a combination of:

broadcast signaling;
RRC signaling;
DCI signaling;
NRPP signaling.

In one embodiment, any one of the positioning measurement values includes at least one or a combination of: RSTD, terminal receiving-transmitting time difference.

In one embodiment, any one of the quality indications of the positioning measurement values includes at least one or a combination of: RSRP, RSRQ, SINR, an error of a measurement value; a decision result of a quality indication of a positioning measurement value.

A transceiver 610 is configured to receive and send the data under the control of the processor 600.

Here, in FIG. 8, the bus architecture may include any numbers of interconnected buses and bridges, and specifically link various circuits of one or more processors represented by the processor 600 and the memory represented by the memory 620. The bus architecture may further link various other circuits such as peripheral device, voltage regulator and power management circuit, which are all well known in the art and thus will not be further described again herein. The bus interface provides an interface. The transceiver 610 may be a plurality of elements, i.e., include a transmitter and a receiver, and provide the devices for communicating with various other devices over the transmission media. For different user equipments, the user interface 630 may also be the interface capable of interconnecting or exter-connecting with the required devices, and the connected devices include but not limited to keypad, display, loudspeaker, microphone, joystick and the like.

The processor 600 is responsible for managing the bus architecture and general processing, and the memory 620 may store the data used by the processor 600 when performing the operations.

In one embodiment, the processor 600 can be Central Processing Device (CPU), Application Specific Integrated Circuit (ASIC), Field-Programmable Gate Array (FPGA) or Complex Programmable Logic Device (CPLD).

Figure 9:
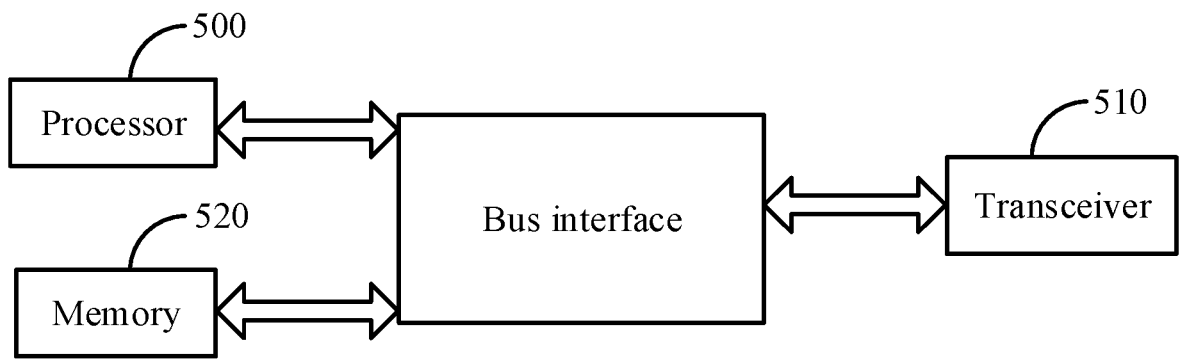
FIG. 9 is a structural schematic diagram of a signal transmission apparatus on the base station side according to an embodiment of the present application.

On the base station side, referring to FIG. 9, a signal transmission apparatus provided by an embodiment of the present application includes:

a memory 520 configured to store program instructions;

a processor 500 configured to invoke the program instructions stored in the memory, and in accordance with the obtained program, perform the process of:

determining a UE-specific reference signal resource; where the UE-specific reference signal resource is determined by a network side based on a quality indication of a positioning measurement value reported by a terminal;

sending a UE-specific RS to the terminal through the UE-specific reference signal resource.

In one embodiment, the processor 500 is further configured to:

determine a cell-specific reference signal resource;

send a cell-specific RS to the terminal through the cell-specific reference signal resource.

In one embodiment, the UE-specific reference signal resource and/or the cell-specific reference signal resource is/are determined by receiving configuration information sent by an LMF.

In one embodiment, the processor 500 is further configured to:

notify the terminal of configuration information of the UE-specific reference signal resource and/or the cell-specific reference signal resource through broadcast signaling, RRC signaling or DCI signaling.

The transceiver 510 is configured to receive and send the data under the control of the processor 500.

Here, in FIG. 9, the bus architecture may include any numbers of interconnected buses and bridges, and specifically link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be a plurality of elements, i.e., include a transmitter and a receiver, and provide the devices for communicating with various other devices over the transmission media. The processor 500 is responsible for managing the bus architecture and general processing, and the memory 520 may store the data used by the processor 500 when performing the operations.

The processor 500 may be Central Processing Device (CPU), Application Specific Integrated Circuit (ASIC), Field-Programmable Gate Array (FPGA) or Complex Programmable Logic Device (CPLD).

Figure 10:
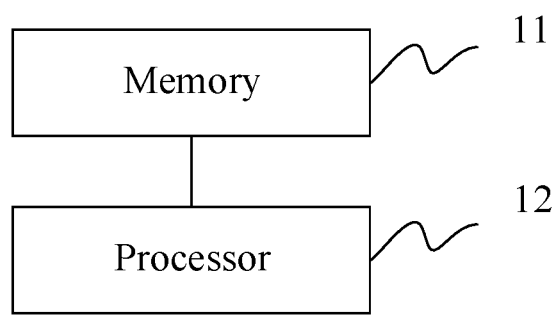
FIG. 10 is a structural schematic diagram of a signal transmission apparatus on the LMF entity side according to an embodiment of the present application.

On the LMF side, referring to FIG. 10, a signal transmission apparatus provided by an embodiment of the present application includes:

a memory 11 configured to store program instructions;

a processor 12 configured to invoke the program instructions stored in the memory, and in accordance with the obtained program, perform the process of:

determining a UE-specific reference signal resource based on a quality indication of a positioning measurement value reported by a terminal;

sending configuration information of the UE-specific reference signal resource.

In one embodiment, determining the UE-specific reference signal resource based on the quality indication of the positioning measurement value reported by the terminal, specifically includes:

if a quality indication of a first positioning measurement value reported by the terminal is received, then determining a decision result of whether the quality indication of the first positioning measurement value satisfies a performance requirement by comparing the quality indication of the first positioning measurement value with a preset threshold value, and determining the UE-specific reference signal resource according to the decision result;

if a decision result of a quality indication of a first positioning measurement value reported by the terminal is received, then determining the UE-specific reference signal resource directly according to the decision result, where the decision result represents whether the quality indication of the first positioning measurement value satisfies a performance requirement.

In one embodiment, the UE-specific reference signal resource determined for the terminal is a first UE-specific reference signal resource when the decision result indicates that the quality indication of the first positioning measurement value does not satisfy the performance requirement, and the UE-specific reference signal resource determined for the terminal is a second UE-specific reference signal resource when the decision result indicates that the quality indication of the first positioning measurement value satisfies the performance requirement;

a frequency-domain bandwidth occupied by the first UE-specific reference signal resource is greater than a frequency-domain bandwidth occupied by the second UE-specific reference signal resource, and/or a quantity of time-domain OFDM symbols occupied by the first UE-specific reference signal resource is greater than a quantity of time-domain OFDM symbols occupied by the second UE-specific reference signal resource.

In one embodiment, the processor 12 is further configured to: receive a third positioning measurement value reported by the terminal, and determine a position of the terminal.

The memory 11 can store the data used by the processor 12 when performing the operations.

The processor 12 may be Central Processing Device (CPU), Application Specific Integrated Circuit (ASIC), Field-Programmable Gate Array (FPGA) or Complex Programmable Logic Device (CPLD).

Figure 11:
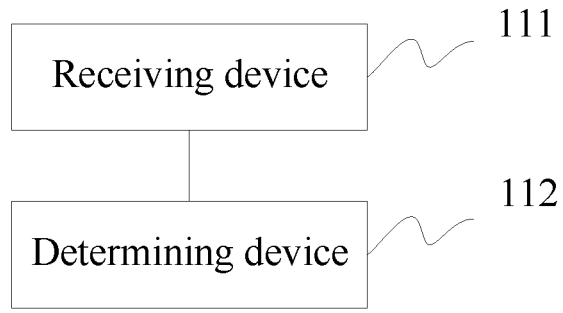
FIG. 11 is a structural schematic diagram of another signal transmission apparatus on the terminal side according to an embodiment of the present application.

On the terminal side, referring to FIG. 11, another signal transmission apparatus provided by an embodiment of the present application includes:

a receiving device 111 configured to receive a UE-specific RS through a UE-specific reference signal resource; where the UE-specific reference signal resource is determined by a network side based on a quality indication of a positioning measurement value determined by a terminal;

a determining device 112 configured to determine and report the positioning information based on measuring the UE-specific RS.

In one embodiment, the UE-specific reference signal resource is determined by the network side based on a first positioning measurement value and a quality indication of the first positioning measurement value or the first positioning measurement value and a decision result of the quality indication of the first positioning measurement value reported by the terminal.

In one embodiment, the determining device 112 is configured to:

determine a second positioning measurement value by measuring the UE-specific RS;

determine a quality indication of the second positioning measurement value and/or a decision result of the quality indication of the second positioning measurement value according to the second positioning measurement value;

determine and report a third positioning measurement value based on a first positioning measurement value obtained by measuring a cell-specific RS and the second positioning measurement value.

In one embodiment, the determining device 112 is further configured to:

determine a quality indication of the second positioning measurement value and/or a decision result of the quality indication of the second positioning measurement value according to the second positioning measurement value;

the determining device 112 is configured to:

process the first positioning measurement value and the second positioning measurement value according to the quality indication of the first positioning measurement value and/or the decision result of the quality indication of the first positioning measurement value as well as the quality indication of the second positioning measurement value and/or the decision result of the quality indication of the second positioning measurement value, to determine the third positioning measurement value.

In one embodiment, any one of the RSs includes one or a combination of: NR PRS, CSI-RS, SSB.

In one embodiment, configuration information of any one of the reference signal resources is obtained through one or a combination of:

broadcast signaling;
RRC signaling;
DCI signaling;
NRPP signaling.

In one embodiment, any one of the positioning measurement values includes at least one or a combination of: RSTD, terminal receiving-transmitting time difference.

In one embodiment, any one of the quality indications of the positioning measurement values includes at least one or a combination of: RSRP, RSRQ, SINR, an error of a measurement value; a decision result of a quality indication of a positioning measurement value.

Figure 12:
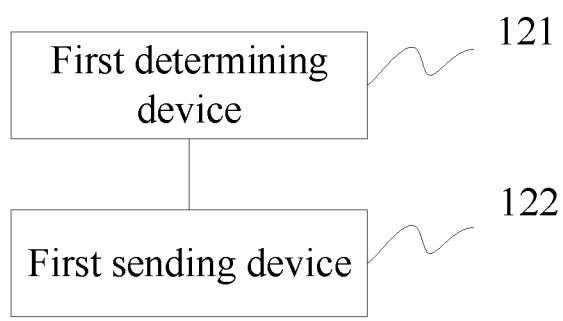
FIG. 12 is a structural schematic diagram of another signal transmission apparatus on the base station side according to an embodiment of the present application.

On the base station side, referring to FIG. 12, another signal transmission apparatus provided by an embodiment of the present application includes:

a first determining device 121 configured to determine a UE-specific reference signal resource; where the UE-specific reference signal resource is determined by a network side based on a quality indication of a positioning measurement value reported by a terminal;

a first sending device 122 configured to send a UE-specific RS to the terminal through the UE-specific reference signal resource.

In one embodiment, the first determining device 121 is further configured to: determine a cell-specific reference signal resource;

the first sending device 122 is further configured to: send a cell-specific RS to the terminal through the cell-specific reference signal resource.

In one embodiment, the UE-specific reference signal resource and/or the cell-specific reference signal resource is/are determined by receiving configuration information sent by an LMF.

In one embodiment, the first sending device 122 is further configured to:

notify the terminal of configuration information of the UE-specific reference signal resource and/or the cell-specific reference signal resource through broadcast signaling, RRC signaling or DCI signaling.

Figure 13:
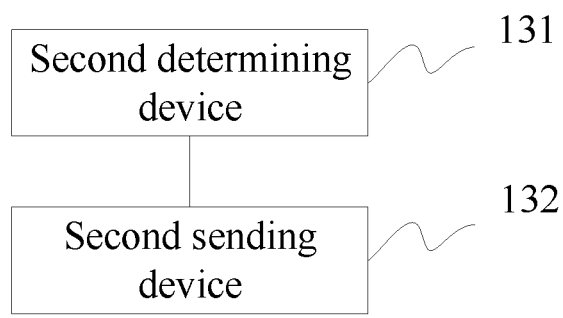
FIG. 13 is a structural schematic diagram of another signal transmission apparatus on the LMF entity side according to an embodiment of the present application.

On the LMF side, referring to FIG. 13, another signal transmission apparatus provided by an embodiment of the present application includes:

a second determining device 131 configured to determine a UE-specific reference signal resource based on a quality indication of a positioning measurement value reported by a terminal;

a second sending device 132 configured to send the configuration information of the UE-specific reference signal resource.

In one embodiment, the second determining device 131 is configured to:

if a quality indication of a first positioning measurement value reported by the terminal is received, then determine a decision result of whether the quality indication of the first positioning measurement value satisfies a performance requirement by comparing the quality indication of the first positioning measurement value with a preset threshold value, and determine the UE-specific reference signal resource according to the decision result;

if a decision result of a quality indication of a first positioning measurement value reported by the terminal is received, then determine the UE-specific reference signal resource directly according to the decision result, where the decision result represents whether the quality indication of the first positioning measurement value satisfies a performance requirement.

In one embodiment, the UE-specific reference signal resource determined for the terminal is a first UE-specific reference signal resource when the decision result indicates that the quality indication of the first positioning measurement value does not satisfy the performance requirement, and the UE-specific reference signal resource determined for the terminal is a second UE-specific reference signal resource when the decision result indicates that the quality indication of the first positioning measurement value satisfies the performance requirement;

a frequency-domain bandwidth occupied by the first UE-specific reference signal resource is greater than a frequency-domain bandwidth occupied by the second UE-specific reference signal resource, and/or a quantity of time-domain OFDM symbols occupied by the first UE-specific reference signal resource is greater than a quantity of time-domain OFDM symbols occupied by the second UE-specific reference signal resource.

In one embodiment, the second determining device 131 is further configured to:

receive a third positioning measurement value reported by the terminal, and determine a position of the terminal.

It should be noted that the division of devices in the embodiments of the present application is illustrative, and is merely a kind of logical function division, and there may be other division methods in actual implementations. In addition, the functional devices in each embodiment of the present application may be integrated into one processing device, or each device may exist alone physically, or two or more devices may be integrated into one device. The above-mentioned integrated devices can be implemented in the form of hardware, or can be implemented in the form of software functional devices.

When the integrated device is implemented in the form of software functional device and sold or used as an independent product, it may be stored in a computer readable storage medium. Based on such understanding, embodiments of the present application essentially or a part that contributes to the prior art or all or a part of the embodiments may be embodied in the form of software product. The computer software product is stored in a storage medium, and includes several instructions used to enable a computer device (which may be a personal computer, server, or network device, etc.) or a processor to perform all or some of the steps of the methods of various embodiments of the present application. The above-mentioned storage medium includes: USB flash drive, mobile hard disk, Read-Only Memory (ROM), Random Access Memory (RAM), magnetic disk or compact disc or various media that can store the program codes.

An embodiment of the present application provides a computing device, which can specifically be a desktop computer, a portable computer, a smart phone, a tablet computer, a Personal Digital Assistant (PDA) or the like. The computing device can include a Center Processing Device (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In an embodiment of the present application, the memory may be used to store the program of any one of the methods provided by the embodiments of the present application.

The processor invokes the program instructions stored in the memory and is configured to perform any one of the methods provided by the embodiments of the present application in accordance with the obtained program instructions.

An embodiment of the present application provides a computer storage medium for storing the computer program instructions used by the apparatuses provided by the embodiments of the present application described above, where the computer storage medium contains the program for performing any one of the methods provided by the embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by the embodiments of the present application may be applied to the terminal devices, and may also be applied to the network devices.

Here, the terminal device can also referred to as the User Equipment ("UE" for short), Mobile Station ("MS" for short), Mobile Terminal ("MT" for short) or the like. In one embodiment, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device includes a base station (e.g., an access point), which refers to a device in the access network communicating with wireless terminals via one or more sectors over the air interface. The base station may be used to perform the inter-conversion between the received air frame and the IP packet, and used as the router between the wireless terminal and the rest of the access network, where the rest of the access network may include Internet Protocol (IP) networks. The base station may further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like, which is not limited in the embodiments of the present application.

The processing flows of the above methods may be implemented by a software program, which may be stored in a storage medium. When the stored software program is invoked, the above method steps are performed.

In summary, the embodiments of the present application propose an adaptive UE-specific RS configuration method based on the quality indication of the positioning measurement value or the decision result of the quality indication of the positioning measurement value, to avoid two possible problems in the system: (1) when the UE has the better measurement accuracy based on cell-specific RSs, the network configures UE-specific RS resources with higher measurement accuracy, resulting in a waste of RS resources; (2) when the UE has the poor measurement accuracy based on cell-specific RSs, the network configures UE-specific RS resources with lower measurement accuracy, so that the UE-specific RS resources cannot meet the measurement accuracy.

It should be understood that the embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A signal transmission method, comprises:
   receiving at least one UE-specific Reference Signal, RS, through at least one UE-specific reference signal resource; wherein the at least one UE-specific reference signal resource is determined by a network side based on at least one quality indication of at least one positioning measurement value determined by a terminal;
   determining and reporting positioning information based on measuring the at least one UE-specific RS.

2. The method according to claim 1, wherein the quality indication of the positioning measurement value is determined by followings:
   obtaining configuration information of cell-specific reference signal resources;
   receiving a cell-specific RS according to the configuration information of cell-specific reference signal resources;
   determining a first positioning measurement value by measuring the cell-specific RS, and determining a quality indication of the first positioning measurement value and/or a decision result of the quality indication of the first positioning measurement value.

3. The method according to claim 2, wherein the determining the decision result of the quality indication of the first positioning measurement value, comprises:
   determining a decision result of whether the quality indication of the first positioning measurement value satisfies a performance requirement by comparing the quality indication of the first positioning measurement value with a preset threshold value.

4. The method according to claim 1, wherein the UE-specific reference signal resource is determined by the network side based on a first positioning measurement value and a quality indication of the first positioning measurement value or the UE-specific reference signal resource is determined by the network side based on the first positioning measurement value and a decision result of the quality indication of the first positioning measurement value reported by the terminal.

5. The method according to claim 1, wherein the determining and reporting the positioning information based on measuring the at least one UE-specific RS, comprises:
   determining a second positioning measurement value by measuring the at least one UE-specific RS;
   determining a quality indication of the second positioning measurement value and/or a decision result of the quality indication of the second positioning measurement value according to the second positioning measurement value;
   determining—a third positioning measurement value based on a first positioning measurement value obtained by measuring a cell-specific RS and the second positioning measurement value, comprises: processing the first positioning measurement value and the second positioning measurement value according to the quality indication of the first positioning measurement value and/or the decision result of the quality indication of the first positioning measurement value as well as the quality indication of the second positioning measurement value and/or the decision result of the quality indication of the second positioning measurement value, to determine the third positioning measurement value;
   reporting the third positioning measurement value.

6. The method according to claim 1, wherein in response to there being one UE-specific RS, the UE-specific RS comprises any one of: New Radio Positioning Reference Signal, NR PRS, Channel State Information-Reference Signal, CSI-RS, Synchronization Signal/PBCH Block, SSB; in response to there being more UE-specific RSs, the UE-specific RSs comprise a combination of: New Radio Positioning Reference Signal, NR PRS, Channel State Information-Reference Signal, CSI-RS, or Synchronization Signal/PBCH Block, SSB.

7. The method according to claim 1, wherein configuration information of the at least one reference signal resource is obtained through one or a combination of:
   broadcast signaling;
   Radio Resource Control, RRC, signaling;
   Downlink Control Information, DCI, signaling;
   New Radio Positioning Protocol A, NRPPa, signaling.

8. The method according to claim 1, wherein the at least one positioning measurement value comprises one of Reference Signal Time Difference, RSTD, or terminal receiving-transmitting time difference in response to there being one positioning measurement value, the at least one positioning measurement value comprises a combination of Reference Signal Time Difference, RSTD, terminal receiving-transmitting time difference in response to there being more positioning measurement values.

9. The method according to claim 1, wherein the at least one quality indication comprises one of Reference Signal Received Power, RSRP, Reference Signal Received Quality, RSRQ, Signal to Interference plus Noise Ratio, SINR, an error of a measurement value, or a decision result of a quality indication of a positioning measurement value, in response to there being one quality indication, the at least one quality indication comprises a combination of Reference Signal Received Power, RSRP, Reference Signal Received Quality, RSRQ, Signal to Interference plus Noise Ratio, SINR, an error of a measurement value, or a decision result of a quality indication of a positioning measurement value, in response to there being more quality indications.

10. A signal transmission apparatus, comprises:
a memory configured to store program instructions;
a processor configured to invoke the program instructions stored in the memory to implement the method of claim 1.

11. A signal transmission method, comprises:
determining a UE-specific reference signal resource; wherein the UE-specific reference signal resource is determined by a network side based on a quality indication of a positioning measurement value reported by a terminal;
sending a UE-specific Reference Signal, RS, to the terminal through the UE-specific reference signal resource.

12. The method according to claim 11, further comprises:
determining a cell-specific reference signal resource;
sending a cell-specific RS to the terminal through the cell-specific reference signal resource.

13. The method according to claim 11, wherein the UE-specific reference signal resource and/or the cell-specific reference signal resource is/are determined by receiving configuration information sent by a Location Management Function, LMF.

14. The method according to claim 13, further comprises:
notifying the terminal of configuration information of the UE-specific reference signal resource and/or the cell-specific reference signal resource through broadcast signaling, Radio Resource Control, RRC, signaling or Downlink Control Information, DCI, signaling.

15. A signal transmission apparatus, the apparatus comprises:
a memory configured to store program instructions;
a processor configured to invoke the program instructions stored in the memory to implement the method of claim 11.

16. A signal transmission method, comprises:
determining a UE-specific reference signal resource based on a quality indication of a positioning measurement value reported by a terminal;
sending configuration information of the UE-specific reference signal resource.

17. The method according to claim 16, wherein the determining the UE-specific reference signal resource based on the quality indication of the positioning measurement value reported by the terminal, comprises:
in response to a quality indication of a first positioning measurement value reported by the terminal being received, determining a decision result of whether the quality indication of the first positioning measurement value satisfies a performance requirement by comparing the quality indication of the first positioning measurement value with a preset threshold value, and determining the UE-specific reference signal resource according to the decision result;
in response to the decision result of the quality indication of the first positioning measurement value reported by the terminal being received, determining the UE-specific reference signal resource directly according to the decision result, wherein the decision result represents whether the quality indication of the first positioning measurement value satisfies a performance requirement.

18. The method according to claim 17, wherein the UE-specific reference signal resource determined for the terminal is a first UE-specific reference signal resource in response to the decision result indicating that the quality indication of the first positioning measurement value does not satisfy the performance requirement, and the UE-specific reference signal resource determined for the terminal is a second UE-specific reference signal resource in response to the decision result indicating the quality indication of the first positioning measurement value satisfies the performance requirement;
a frequency-domain bandwidth occupied by the first UE-specific reference signal resource is greater than a frequency-domain bandwidth occupied by the second UE-specific reference signal resource, and/or a quantity of time-domain OFDM symbols occupied by the first UE-specific reference signal resource is greater than a quantity of time-domain OFDM symbols occupied by the second UE-specific reference signal resource.

19. The method according to claim 16, further comprises:
receiving a third positioning measurement value reported by the terminal, and determining a position of the terminal.

20. A signal transmission apparatus, comprises:
a memory configured to store program instructions;
a processor configured to invoke the program instructions stored in the memory to implement the method of claim 16.

* * * * *